(12) United States Patent
Hong et al.

(10) Patent No.: US 8,643,936 B2
(45) Date of Patent: Feb. 4, 2014

(54) DEVICES AND METHODS FOR ACHIEVING NON-CONTACTING WHITE STATE IN INTERFEROMETRIC MODULATORS

(75) Inventors: John H. Hong, San Clemente, CA (US); Marc Maurice Mignard, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 233 days.

(21) Appl. No.: 13/308,324

(22) Filed: Nov. 30, 2011

(65) Prior Publication Data
US 2012/0281270 A1  Nov. 8, 2012

Related U.S. Application Data

(60) Provisional application No. 61/482,478, filed on May 4, 2011.

(51) Int. Cl.
*G02B 26/00* (2006.01)

(52) U.S. Cl.
USPC ........... 359/291; 359/290; 359/237; 359/586; 136/257

(58) Field of Classification Search
USPC ......... 359/290–295, 298, 237, 586–589, 318; 136/244, 246, 256, 257; 427/58, 74; 156/247; 438/65, 70; 250/330, 332, 250/338.1
See application file for complete search history.

(56) References Cited

U.S. PATENT DOCUMENTS

| | | | |
|---|---|---|---|
| 5,151,585 A | 9/1992 | Siebert | |
| 6,040,937 A | 3/2000 | Miles | |
| 6,080,988 A * | 6/2000 | Ishizuya et al. | 250/338.1 |
| 6,323,987 B1 | 11/2001 | Rinaudo et al. | |
| 6,674,562 B1 | 1/2004 | Miles et al. | |
| 6,882,461 B1 * | 4/2005 | Tsai et al. | 359/290 |
| 7,113,339 B2 * | 9/2006 | Taguchi et al. | 359/586 |
| 7,123,216 B1 | 10/2006 | Miles | |

(Continued)

FOREIGN PATENT DOCUMENTS

| | | |
|---|---|---|
| EP | 2 051 124 | 4/2009 |
| EP | 2051124 | 4/2009 |

(Continued)

OTHER PUBLICATIONS

International Preliminary Report on Patentability in PCT Application No. PCT/US2012/036153, dated Jul. 1, 2013.

(Continued)

*Primary Examiner* — Loha Ben
(74) *Attorney, Agent, or Firm* — Knobbe, Martens, Olson & Bear, LLP

(57) ABSTRACT

This disclosure provides systems, methods and apparatus for providing white light color output from an electromechanical systems (EMS) device with reduced likelihood of stiction. In one aspect, interferometric modulators are configured to provide a white color output while having a non-zero modulator gap dimension. Such a feature can reduce problems associated with zero modulator gap dimensions such as stiction. Various methodologies can be used to yield such a non-zero modulator gap and a white color output. In some implementations, for example, an optical element that introduced wavelength dependent phase shift is used. In some implementations this wavelength dependent phase shifting optical element includes a stack of color filters, a hologram, a diffraction grating, or layers of material having specific thicknesses and wavelength dependent indices of refraction.

38 Claims, 17 Drawing Sheets

(56) References Cited

U.S. PATENT DOCUMENTS

| | | | |
|---|---|---|---|
| 7,327,510 B2 | 2/2008 | Cummings et al. | |
| 7,564,613 B2 | 7/2009 | Sasagawa et al. | |
| 8,058,549 B2 * | 11/2011 | Kothari et al. | 136/257 |
| 8,193,441 B2 * | 6/2012 | Kothari et al. | 136/244 |
| 2004/0188599 A1 | 9/2004 | Viktorovitch | |
| 2004/0217264 A1 | 11/2004 | Wood et al. | |
| 2005/0046919 A1 | 3/2005 | Taguchi et al. | |
| 2006/0077148 A1 | 4/2006 | Gally | |
| 2007/0097694 A1 | 5/2007 | Faase et al. | |
| 2007/0236774 A1 | 10/2007 | Gousev | |
| 2011/0075241 A1 | 3/2011 | Mienko et al. | |
| 2011/0075245 A1 | 3/2011 | Hashimura et al. | |

FOREIGN PATENT DOCUMENTS

| | | |
|---|---|---|
| JP | 11-211999 | 8/1999 |
| WO | 2009137535 | 11/2009 |
| WO | WO 2009/137535 | 11/2009 |

OTHER PUBLICATIONS

Written Opinion of the International Preliminary Examining Authority in PCT Application No. PCT/US2012/036153, dated Apr. 12, 2013.

International Search Report and Written Opinion in International Publication No. PCT/US2012/036153 dated Jul. 19, 2012.

ISR and WO dated Jul. 19, 2012 in PCT/US12/036153.

* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

DEVICES AND METHODS FOR ACHIEVING NON-CONTACTING WHITE STATE IN INTERFEROMETRIC MODULATORS

CROSS-REFERENCE TO RELATED APPLICATIONS

This disclosure claims priority to U.S. Provisional Patent Application No. 61/482,478, filed May 4, 2011, entitled "Devices and Methods for Achieving Non-Contacting White State in Analog Interferometric Modulators," and assigned to the assignee hereof. The disclosure of the prior application is considered part of, and is incorporated by reference in, this disclosure.

TECHNICAL FIELD

The present disclosure generally relates to the field of electromechanical systems and display technology, and for example, to devices and methods for achieving non-contacting white and other color states in interferometric modulators.

DESCRIPTION OF RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

One type of interferometric modulator, referred to as a bi-stable or binary IMOD, has two states. For example, in one state the reflective membrane or mirror may be closer to the substrate (and an absorber layer deposited thereon) than in another state. The result may be different optical outputs from the IMOD when the IMOD is in the two different states. For example, the IMOD may output one color in one state and another color in the other state. In one implementation, for example, the IMOD may output white in one state and red in another state. In another implementation, the IMOD may output black in one state and green in another state. Other combinations of different color outputs are possible.

An analog interferometric modulator (IMOD) has a desirable property of being able to display a larger number of different colors, including black and white, from a single modulator. An example analog IMOD may, for example, output red, green, blue, black or white by depending on how close the reflective membrane is to the substrate. In contrast to having two states that produce two different optical outputs, an analog IMOD may be controlled electronically to provide one of many different optical outputs.

In certain IMODs, a white reflection can be achieved by having two surfaces, such as an absorber layer and a mirror, come very close to each other or to even contact each other. However, certain analog IMODs, as well as certain binary IMODs, are sometimes subjected to a condition where two surfaces come in contact or sufficiently close that contact is likely. Such a contact can result in a condition referred to as "stiction" which can affect reliability. The two surfaces may stick together in some situations damaging the IMOD.

SUMMARY

The systems, methods and devices of the disclosure each have several innovative aspects, no single one of which is solely responsible for the desirable attributes disclosed herein.

One innovative aspect of the subject matter described in this disclosure can be implemented in an optical device that comprises a reflector configured to reflect light, an absorber, and an optical element. The absorber is positioned relative to the reflector so as to provide a gap between the reflector and the absorber. At least one of the reflector and the absorber is movable relative to the other. The optical element is disposed with respect to the reflector and the absorber such that when the absorber and the reflector are separated by a non-zero distance of $z_0$ that provides the gap between the absorber and the reflector, incident white light transmitted through the absorber and reflected from the reflector returns to the absorber and passes therethrough as a substantially white color output from the optical device.

The reflector can be configured to move with application of an electrical signal to the optical device. The reflector and the absorber can include metal.

In some implementations, the optical element includes at least one wavelength selective reflective filter. In various implementations, the optical element includes a hologram. In certain implementations, the optical element includes a diffraction grating such as a reflective grating. In some implementations the optical element includes a plurality of layers of material having indices of refraction that vary with wavelength. In some implementations, the optical element includes at least one layer of material comprising a complex refractive index.

The optical element can be disposed between the absorber and the reflector. The gap can include an air gap. For example, the air gap can be at least about 50 nm such that the absorber and the reflector are separated by at least about 50 nm. In another example, the air gap can be at least about 100 nm such that the absorber and the reflector are separated by at least about 100 nm.

A substantially black color output for the optical device can be obtained when the absorber and the reflector are separated by a distance of $z_{Black}+z_0$. Different color outputs for the optical device can be obtained when the absorber and the reflector are separated by a distance greater than $z_{Black}+z_0$.

In some implementations, the optical device includes an interferometric modulator. Certain implementations may include a display having an array of the interferometric modulators. The display can further include, for example, a processor that is configured to communicate with the array, wherein the processor is configured to process image data, and a memory device that is configured to communicate with the processor.

Another innovative aspect of the subject matter described in this disclosure can be implemented in an interferometric modulator that includes an absorber configured to receive light and pass at least a portion of the light and one or more optical elements including a reflective surface configured to receive light from the absorber and reflect the light back to the absorber. The one or more optical elements are configured to provide different phase shifts for different wavelength components of the light reflected back to the absorber such that a plurality of wavelength components substantially pass through the absorber to yield a substantially white color output from the interferometric modulator when the absorber is spaced apart from the reflective surface by a gap. The wavelengths components passed through the absorber and included in the white output, can for example, correspond to red, green and blue color light.

In some implementations, the one or more optical elements include at least one thin film reflecting filter configured to selectively reflect at least one of the wavelength components such that different wavelength components propagate different distances from the reflective surface to the absorber thereby introducing different phases shifts therebetween. In certain implementations, the one or more optical elements also includes at least one hologram having a plurality of phase-shifting features configured to phase shift different wavelength components different amounts. The hologram can include the reflective surface so as to reflect the waves components back to the absorber. The hologram can be a transmissive hologram wherein the reflective surface is not part of the hologram.

In some implementations, the one or more optical elements include a plurality of optical layers, each layer having a thickness and a refractive index, such that the different wavelength components passing through the plurality of optical layers and returning to the absorber are provided with the different phase shifts.

In some implementations, the one or more optical elements include at least one of a dielectric layer and a reflector layer having a complex refractive index so as to provide different phase shifts to different wavelength components reflected back to the absorber. In various implementations, the one or more optical elements include a dielectric layer and a reflector layer, each of the absorber, dielectric layer and reflector layer having a complex refractive index such that the absorber, dielectric layer and the reflector layer provide different phase shifts to different wavelength components. For example, at least one of the absorber and the dielectric layer can have a real portion of the complex refractive index that increases as a function of wavelength. In some implementations, the one or more optical elements includes a diffraction grating configured to provide different path lengths for different wave components, the difference in path lengths providing different phase shifts for the different wavelength components.

The gap can be at least about 50 nm such that the absorber and the reflective surface are separated at least about 50 nm. The gap can also be at least about 100 nm such that the absorber and the reflective surface are separated at least about 100 nm.

Another innovative aspect of the subject matter described in this disclosure can be implemented in an optical device comprising a reflector configured to reflect light and an absorber positioned relative to the reflector so as to provide a gap between the reflector and the absorber. At least one of the reflector and the absorber is movable relative to the other. Additionally, at least one of the reflector and the absorber includes an optical element such that when the gap defines a non-zero distance of $z_0$ between the reflector and the absorber, incident white light is transmitted through the absorber and reflected from the reflector returns to the absorber and is passed therethrough as a substantially white color output from the optical device.

In some implementations, the optical element includes at least one wavelength selective reflective color filter, hologram, diffraction grating, layer of dispersive material, or layer of material having a complex index of refraction or combinations thereof.

Various implementations include an optical device comprising means for reflecting light and means for absorbing light positioned relative to the reflecting means so as to provide a gap between the reflecting means and the absorbing means. At least one of the reflecting means and the absorbing mean is movable relative to the other. The optical device additionally includes an optical element disposed with respect to the reflecting means and the absorbing mean such that when the gap defines a non-zero distance of $z_0$ between the absorbing means and the reflecting means, incident white light transmitted through the absorbing means and reflected from the reflecting means returns to the absorbing means and is passed therethrough as a substantially white color output from the optical device.

The reflecting means can include a reflector or the absorbing means includes an absorber. In some implementations, the optical element includes at least one wavelength selective reflective color filter, hologram, diffraction grating, layer of dispersive material, or layer of material having a complex index of refraction or combinations thereof.

Some implementations include an optical device comprising means for reflecting light and means for absorbing light positioned relative to the reflecting means so as to provide a gap between the reflecting means and the absorbing means wherein at least one of the reflecting means and the absorbing means movable relative to the other. At least one of the reflecting means and the absorbing means includes an optical element such that when the absorbing means and the reflecting means are separated by the gap, incident white light transmitted through the absorbing means and reflected from the reflecting means returns to the absorbing means and is passed therethrough as a substantially white color output from the optical device.

The reflecting means can comprise a reflector or the absorbing means comprises an absorber. In some implementations, the optical element includes at least one wavelength selective reflective color filter, hologram, diffraction grating, layer of dispersive material, or layer of material having a complex index of refraction or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
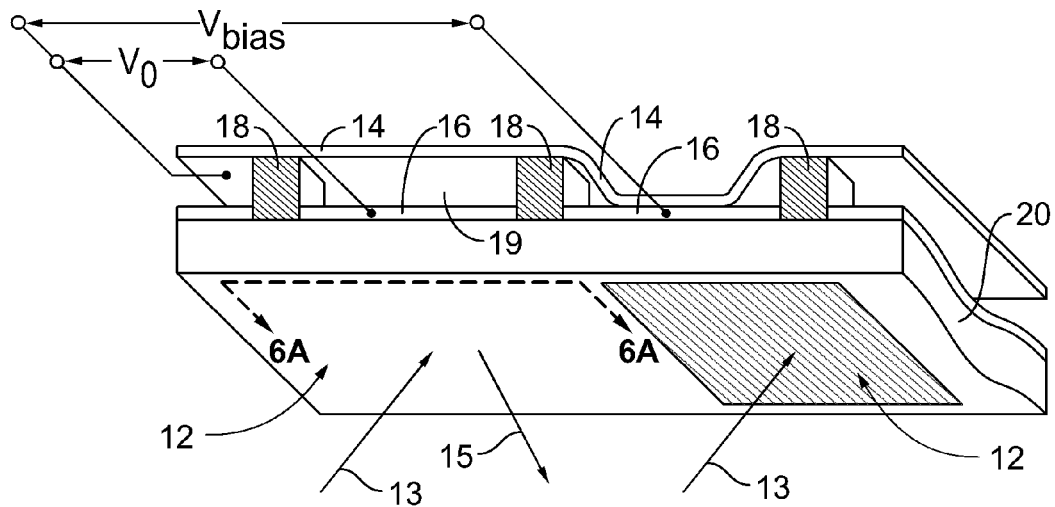
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

In certain implementations as described herein, certain display devices such as interferometric modulators (IMODs) experience an effect sometimes referred to as "stiction." Stiction can result when two surfaces touch or come in close proximity to each other so as to increase the likelihood of contact. Such an effect can cause the two surfaces to not separate, and in some situations, damage the IMOD.

In some IMOD implementations, white light may be produced when two reflective surfaces (such as the absorber and the movable reflector) are touching. However, stiction may pose a problem in such cases.

Described herein are various examples of IMODs, including analog IMODs, where a desired output such as a white color output can be effectuated without two surfaces (such as the absorber and the reflector) of the IMOD touching or being likely to come in contact. In various implementations, an optical element such as an optical element that introduces different phase shifts for different wavelengths can used. This optical element can be configured to provide a phase shift for a plurality of wavelengths (such as red, green, and blue) that results in low electric field amplitude of these wavelengths at the absorber when the absorber is at a non-zero distance from the movable reflector. As a result, these wavelengths are not substantially absorbed by the absorber and are output by the IMOD. A white light output is thereby provided when the absorber is separated from the movable reflector.

A variety of different configurations, for example, a variety of different optical elements, can be used to introduce phase shift for different wavelengths. For example, a plurality of different reflective color filter layers may be included in the IMOD, each layer positioned at a different location. The different reflective color filter layers may reflect different colors such that the wavelengths reflected by the respective layers travel a different distance prior to and after being reflected. The result is different optical path lengths, and thus different phase shifts, for each of the different wavelengths. The difference in optical path length can be selected to yield the appropriate phases when these wavelengths reach the absorber. In particular, the phases may be such that the electric field strength for the different wavelengths is reduced at the absorber so that these wavelengths are not substantially absorbed at the absorber.

In another example implementation, a hologram may be configured to introduce different phases for different wavelengths. Similarly, the phase shifts introduced by the hologram for each of the different wavelengths can be selected to yield the appropriate phase when these wavelengths reach the absorber.

In another example implementation, a diffractive optical element such as a diffraction grating can be included within the IMOD to diffract different wavelengths at different angles. The different wavelengths will therefore follow different optical paths and thus travel different distances. The different optical path lengths can be selected to yield the appropriate phases when these wavelengths reach the absorber. In particular, the phase may be such that the electric field strength for the different the wavelengths is reduced at the absorber so that these wavelengths are not substantially absorbed by the absorber. The diffraction grating may include a reflective grating.

In another example implementation, the IMOD may include a plurality of layers having different indices of refraction for different wavelengths. A different phase shift may be imparted on each of the different wavelengths as the light propagates through the layers. The thickness of each of the layers may be selected in accordance with the wavelength dependent refractive indices of the layers such that each of the different wavelengths has the appropriate phase when the respective wavelength reaches the absorber.

In another example implementation, the IMOD includes at least one layer of material having a complex index of refraction that is wavelength dependent such that each of the different wavelengths has the appropriate phase at the absorber. In some implementations, for example, the real part of the complex index of refraction of the material increases with wavelength.

Accordingly, in various implementations, an optical element may be provided that introduces different phase shifts for different wavelengths such that the different wavelengths have the appropriate phase when at the absorber. A low electric field strength at the absorber, for example, may reduce absorption such that a plurality of different wavelength components are output thereby producing white light in the case when a non-zero distance separates the movable mirror and the absorber.

An IMOD having such a feature can further yield other output colors in addition to white, including black and RGB colors so as to function as a color IMOD.

Particular implementations of the subject matter described in this disclosure can be implemented to realize one or more potential advantages. For example, stiction can be reduced even in IMOD configured to produce white light output, compared to IMOD designs in which white light is output by contacting the movable mirror and the absorber.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1,000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
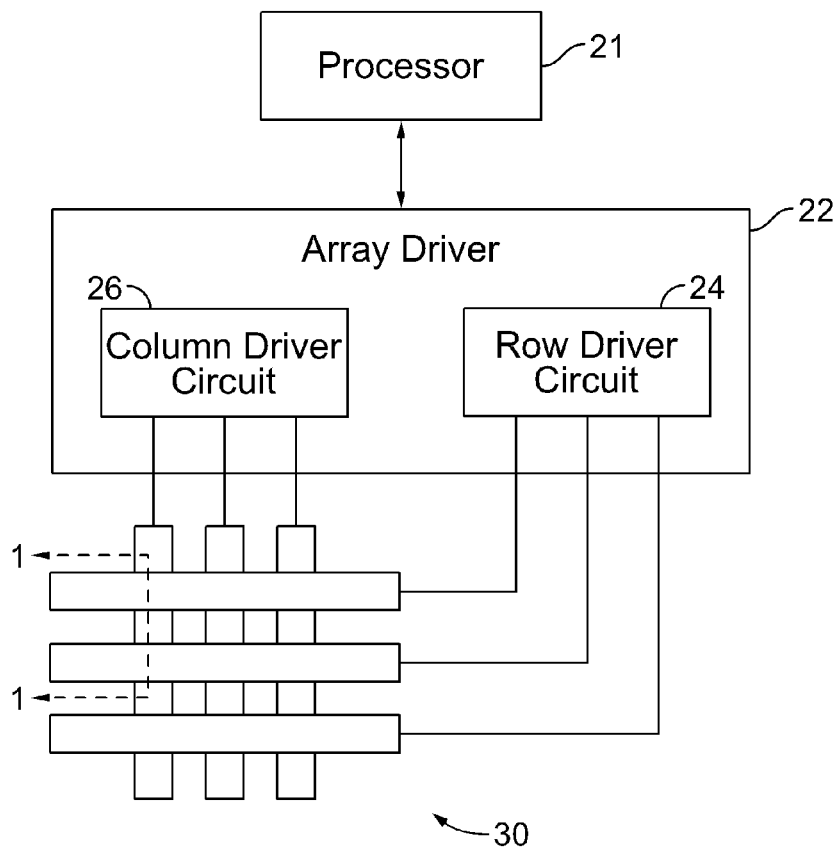
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. These IMODs may include IMODs as discussed above as well as discussed elsewhere throughout the application including but not limited to IMODs that produce a white color output while having a non-zero modulator gap dimension. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
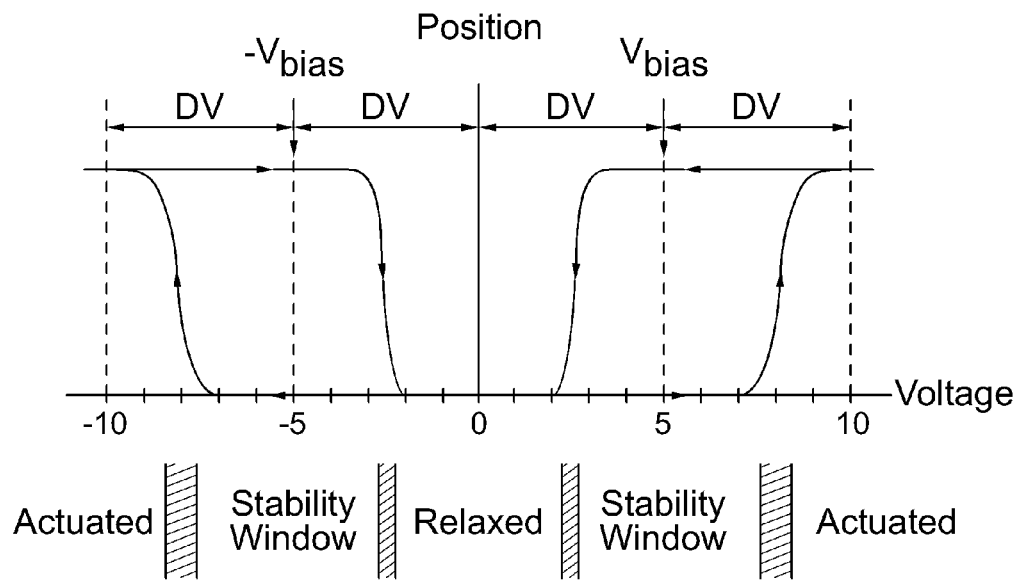
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels are exposed to a steady state or bias voltage difference of approximately 5 volts, in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
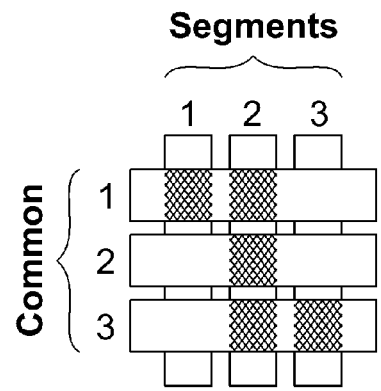
FIG. 5A shows an example of a diagram illustrating a frame of display data in the 3×3 interferometric modulator display of FIG. 2.
Figure 5B:
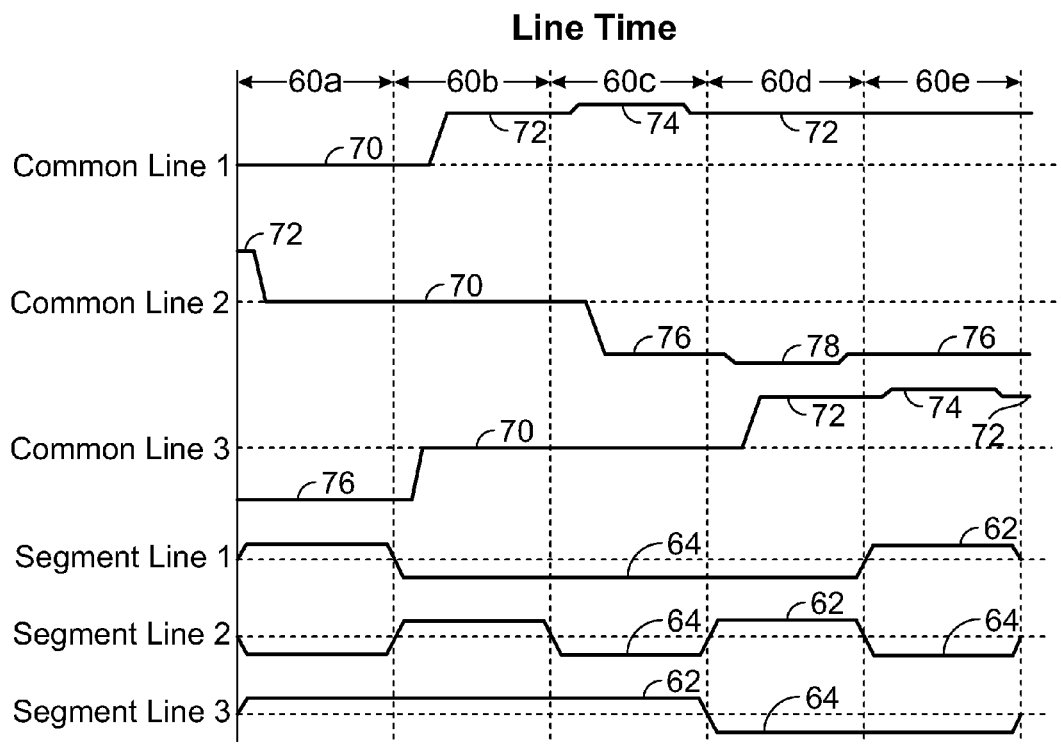
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, for example, 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
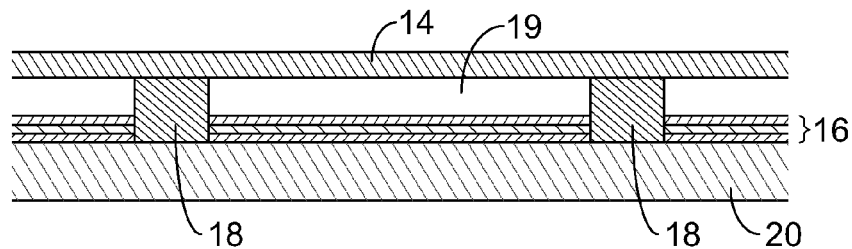
FIG. 6A shows an example of a partial cross-section of the interferometric modulator display of FIG. 1.
Figure 6B:
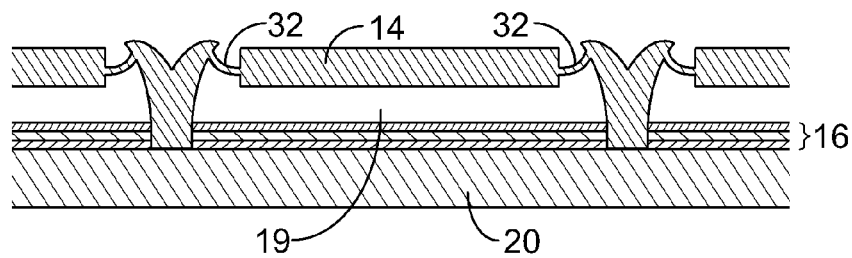
FIGS. 6B-6E show examples of cross-sections of varying implementations of interferometric modulators.
Figure 6C:
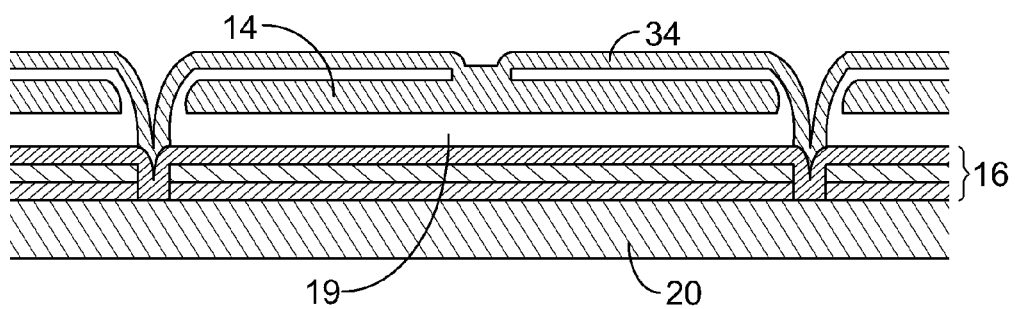

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
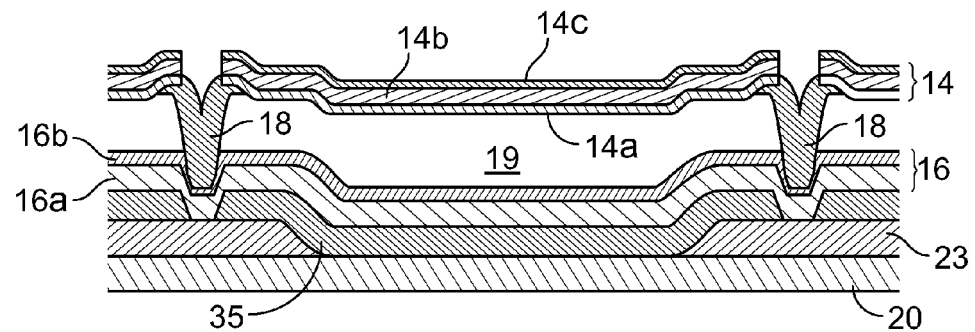

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (such as between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
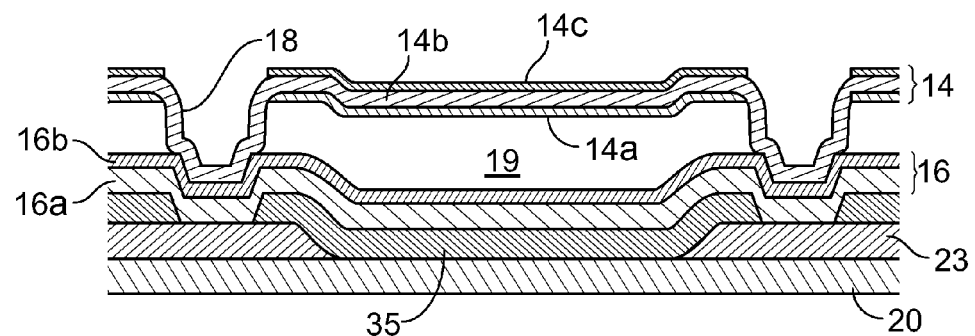

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, for example, patterning.

Figure 7:
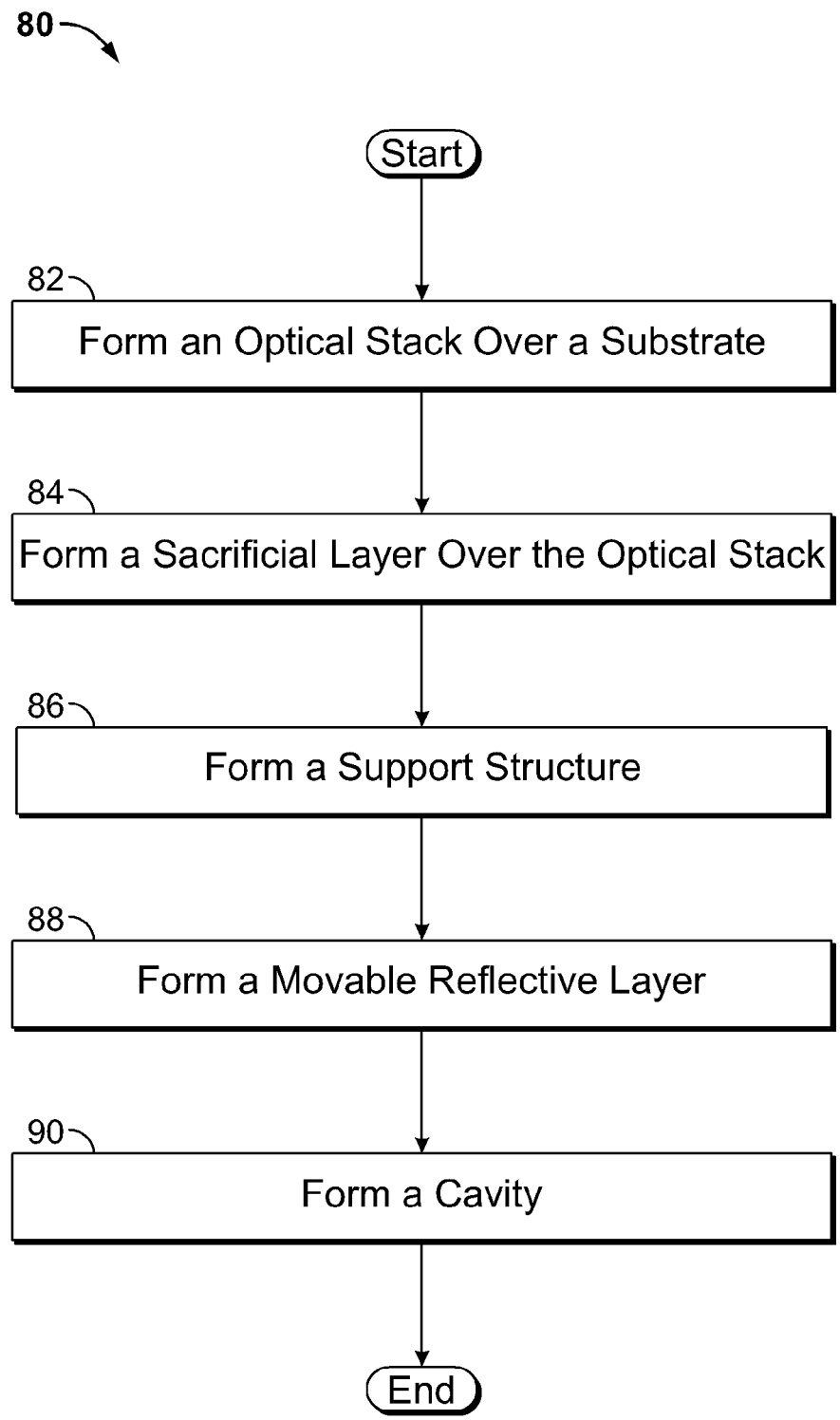
FIG. 7 shows an example of a flow diagram illustrating a manufacturing process for an interferometric modulator.
Figure 8A:
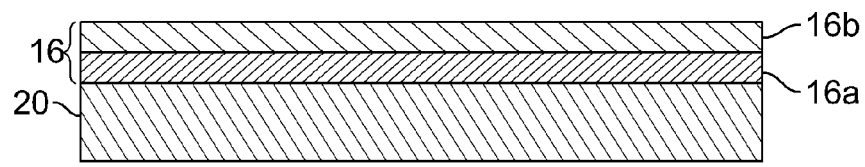
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device such as interferometric modulators of the general type illustrated in FIGS. 1 and 6. The manufacture of an electromechanical systems device can include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
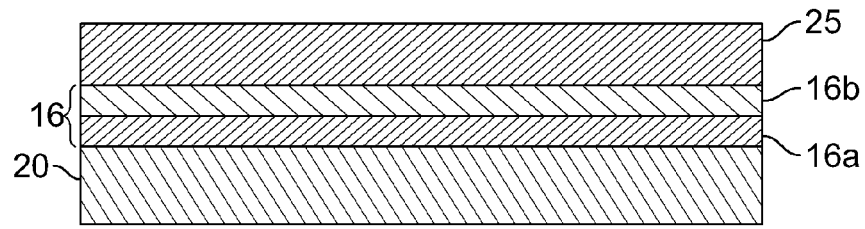

The process 80 continues at block 84 with the formation of a sacrificial layer 25 over the optical stack 16. The sacrificial layer 25 is later removed (see block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, for example, sputtering), plasma-enhanced chemical vapor deposition (PECVD), thermal chemical vapor deposition (thermal CVD), or spin-coating.

Figure 8C:
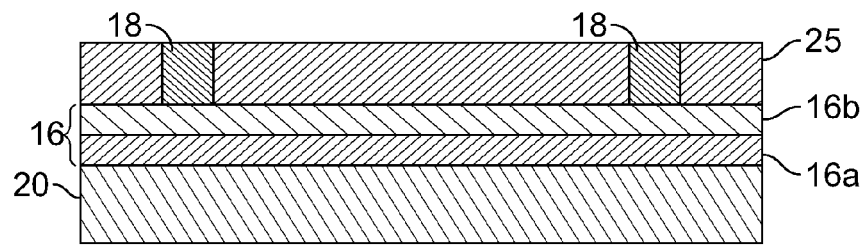

The process 80 continues at block 86 with the formation of a support structure such as post 18 as illustrated in FIGS. 1, 6 and 8C. The formation of the post 18 may include patterning the sacrificial layer 25 to form a support structure aperture, then depositing a material (such as a polymer or an inorganic material, such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
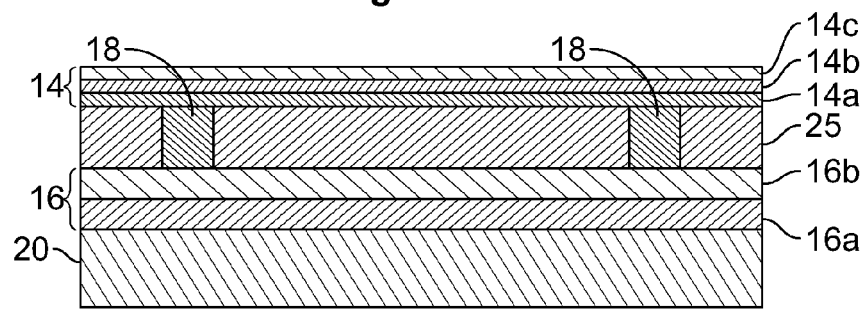
Figure 8E:
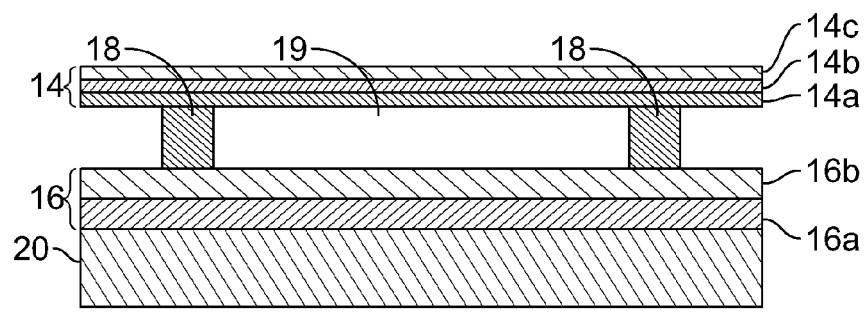

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, including, for example, reflective layer (such as, aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, such as cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

As described herein in reference to FIGS. 1-8, an interferometric modulator can be configured to operate between two modes—one to yield a specific color (e.g., red, green or blue reflected light), and one to yield, for example, a black state. A collection of such color-specific IMODs (e.g., red, green and blue) can be arranged to form a color pixel.

As discussed above, various implementations of IMODs that have two modes, one where the movable mirror is fully actuated and one where the mirror is relaxed, may be referred to as bi-stable. Other implementations of IMODs where the movable layer (either the reflector or the absorber) can be set at one or more intermediate positions in the gap between the fully actuated and relaxed positions may be referred to as tri-state IMODs (in the case where the total number of states is three) as well as analog IMODs. When the movable layer is set at different intermediate positions, different color output may result.

Utilizing the dependence of the color associated with IMODs on gap dimension, a color pixel can be constructed from a single modulator, where the gap dimension can be adjusted to yield different colors. Such modulators may be referred to as analog color IMODs in some cases.

Figure 9A:
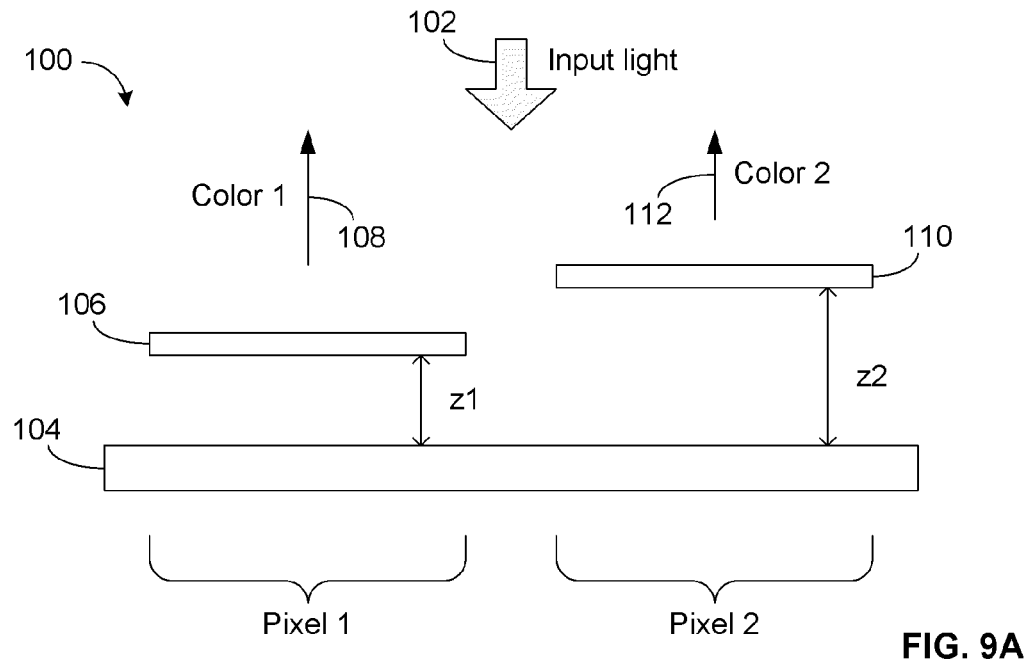
FIG. 9A schematically depicts analog interferometric modulator (IMOD) based pixels having different color outputs, with each analog IMOD having an adjusted spacing between an absorber and a reflector.

In certain IMODs, including analog IMODs, an output color can be determined by an absorber spaced from a reflector (so as to form a gap therebetween). For example, FIG. 9A schematically depicts two example analog color pixels of a display device 100 receiving incident light (arrow 102). The first pixel is shown to have its absorber 106 spaced from a reflector 104 by a gap of z1; and the second pixel is shown to have its absorber 110 spaced from the reflector 104 by a gap of z2. It should be noted that the pixels may or may not be based on the same reflector.

Moreover, in this example, the absorbers 106 and 110 are depicted as movable and the reflector 104 as fixed. Also, the light in this example is incident on the IMODs from the absorber-side (as opposed to the reflector-side). At least part of the light is transmitted through the absorbers 106 and 110 and reflects from the reflector 104 while another portion reflects from the absorbers 106 and 110. The result is a output that is reflected from the IMOD on the absorber-side of the IMOD. Such a configuration differs in many respects to the IMODs shown in FIGS. 1, and 6A-6E. The discussion herein, however, applies to both type of configuration as well as others. For example, in various implementations, the reflector is movable and the absorber is static.

Based on the different gap dimensions z1 and z2, the first and second pixels are depicted as yielding first and second colors, respectively, from reflection of the input light 102. The absorber 106 and 110 and/or the reflector 104 can be moved in a number of ways to increase or decrease the gap dimension.

Figure 9B:
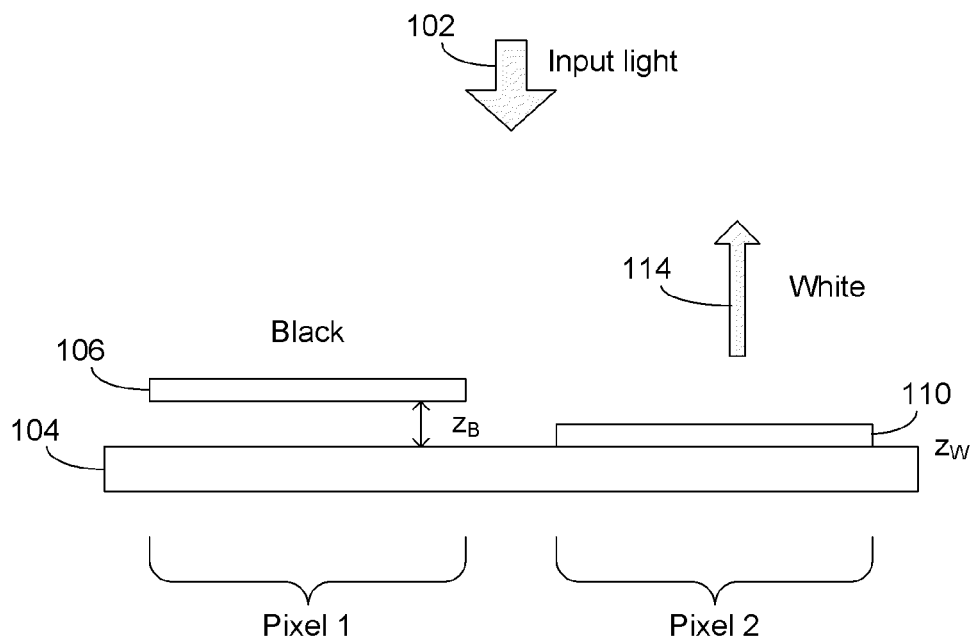
FIG. 9B schematically depicts the example pixels of FIG. 9A in configurations that yield black and white outputs.

In FIG. 9B the two example color pixels are shown to have their gaps reduced to $z_B$ and $z_W$ so as to yield black and white (arrow 114) output responses to the input light 102. A "white" reflection may refer to a reflection of light having wavelength components that are perceived by the human eye as white light. In some implementations, the white reflection includes reflected light having broadband of wavelengths that combine to make a white-like color reflection. In some implementations, the white light includes distinct color components such as red, green and blue components and has a spectra with distinct color peaks centered, for example, at red, green and blue wavelengths. Thus, from FIGS. 9A and 9B, one can see that an analog IMOD has a desirable property of being able to display substantially a large number of colors, as well as black and white, from a single interferometric modulator.

Figure 10A:
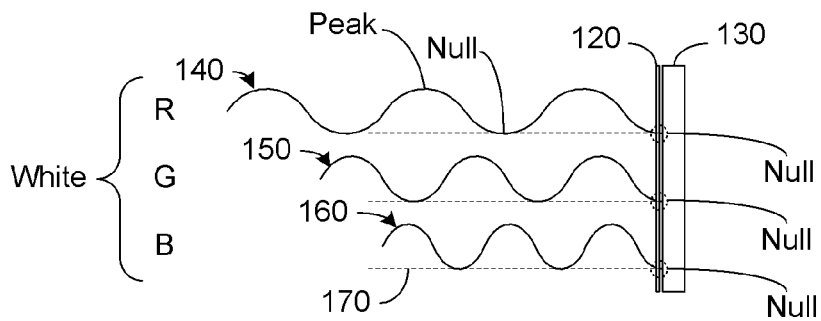
FIGS. 10A-10E show an example of how an analog IMOD can be adjusted to yield white, black, and example colors blue, green and red by adjusting the spacing between its absorber and reflector.

Optical operation of certain analog IMODs is described in reference to FIGS. 10A-10E. An IMOD can include a mirror 130 (such as a metallic mirror) that reflects incident light as shown in FIG. 10A-10E. The waves are characterized by alternating peaks and nulls in amplitude, with the amplitude being representative of the wave's energy (maximum at a peak, and substantially none at a null). Horizontal lines 170 are included to provide visual references for the wave amplitudes. FIGS. 10A-10E schematically illustrate waves for colored light of various wavelengths as a function of distance from the mirror 130. The waves are standing waves. In FIG. 10A, the wave of reflected light of various wavelengths (colors) are depicted with R 140 representing a wave for red colored light, G 150 representing a wave for green colored light, and B 160 representing a wave for blue colored light. At the reflecting surface of the mirror 130, each of the waves R 140, G 150 and B 160 has a fundamental null imposed by a boundary condition of the metallic mirror surface. Such a boundary condition at the metallic mirror surface is generally independent of the wavelength of the reflected wave.

The IMOD depicted in FIGS. 10A-10E further includes an absorber 120 whose separation distance relative to the mirror 130 can be adjusted. The absorber 120 can be configured to absorb a given wave's energy. In the context of energy associated with a wave, energy absorption can occur by the absorber 120 when the wave's amplitude is above its null by some amount at the absorber 120. On the other hand, energy of a wave having a substantial null at the absorber 120 generally does not get absorbed; and thus that wave is substantially transmitted through the absorber 120.

Based on the foregoing, FIG. 10A shows a configuration where the absorber 120 is positioned at or very close to the reflecting surface of the mirror 130. Since the metal surface of the mirror 130 imposes a boundary condition wherein each wavelength of light has a fundamental null the mirror 130, the amplitude of each of the waves R 140, G 150 and B 160 is generally null at the absorber 120. Accordingly, all three colors are transmitted through the absorber 120, resulting in white color for the IMOD.

In the description herein, a white color or condition is described as resulting from red, green and blue colors. It will be understood, however, that other combinations of two or more colors can also yield a white color or any other desirable color; and one or more features of the present disclosure can apply to such situations.

Figure 10B:
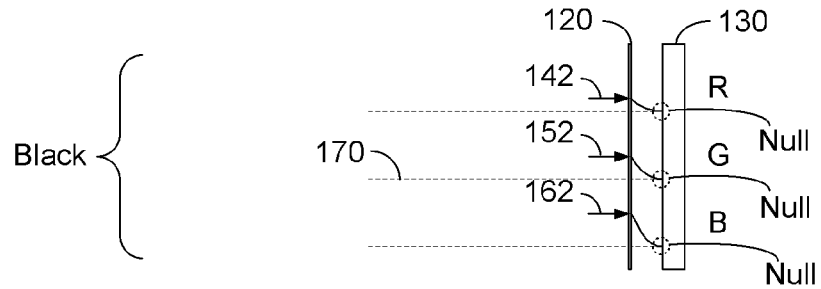

In FIG. 10B, the absorber 120 is shown to be separated from the reflecting surface of the mirror 130 such that amplitudes (the value of the amplitude indicated by arrows 142, 152 and 162) of all of the R, G, and B waves are significantly above the null 170. In certain implementations, the absorber 120 at such a position can absorb approximately equal amounts of energy from the R, G, and B waves, such that the net effect of the reflection will seem black.

Figure 10C:
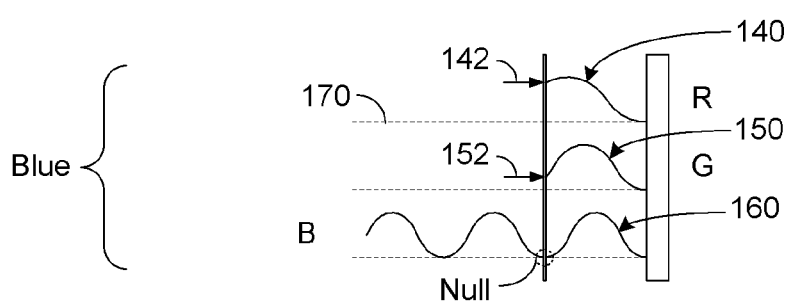

In FIG. 10C, the absorber 120 is shown to be further separated from the reflecting surface of the mirror 130 such that amplitudes 142 and 152 of the R and G waves 140 and 150 are significantly above the null level 170; but the amplitude of the B wave is at a substantial null. Accordingly, R and G waves 140 and 150 are to varying degrees absorbed by the absorber 120, and the B wave 160 is transmitted, resulting in the IMOD displaying a blue color.

Figure 10D:
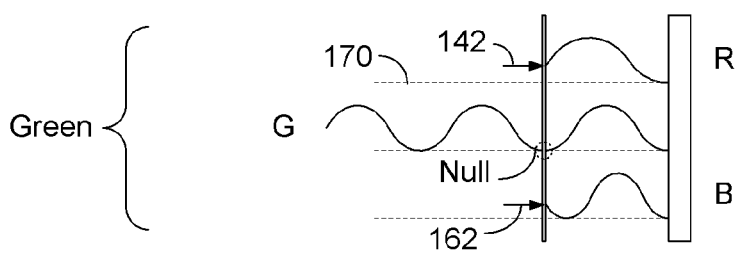

In FIG. 10D, the absorber 120 is shown to be further separated from the reflecting surface of the mirror 130 such that amplitudes 142 and 162 of the R and B waves 140 and 160 are significantly above the null level 170; but the amplitude of the G wave 150 is at a substantial null. Accordingly, R and B waves 140 and 160 are absorbed to varying degrees by the absorber 120, and the G wave 150 is transmitted, resulting in the IMOD displaying a green color.

Figure 10E:
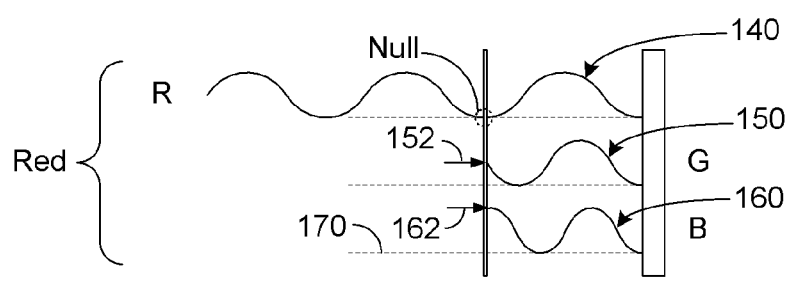

In FIG. 10E, the absorber 120 is shown to be further separated from the reflecting surface of the mirror 130 such that amplitudes 152 and 162 of the G and B waves 150 and 160 are significantly above the null level 170; but the amplitude of the R wave 140 is at a substantial null. Accordingly, G and B waves 150 and 160 are absorbed to varying degrees by the absorber 120, and the R wave 140 is transmitted, resulting in the IMOD displaying a red color.

Other colors can be displayed by the IMOD in similar manners.

In the example IMODs described in reference to FIGS. 9 and 10, the white condition (for example in the second pixel, the pixel on the right side, of FIG. 9B and in FIG. 10A) is achieved by the absorber and reflector coming in contact, or sufficiently close that contact is unavoidable or likely. When the absorber surface is in contact with or sufficiently close to the reflecting surface, a phenomenon known as "stiction" can result in the absorber undesirably sticking to the reflector. Such an IMOD with a stuck absorber can be damaged permanently.

Accordingly, one approach to reducing stiction is to separate the absorber from the reflector. For example, the IMOD can be configured such that an air gap separates the absorber from the reflector when the IMOD is in black states, color states, and white states. Various implementations that provide for an air gap between the absorber and the reflector for various output states of the IMOD are discussed below.

In the example IMODs described in reference to FIGS. 9 and 10, phases of incoming light waves at the absorber are generally determined by the distance from the absorber to the metal reflecting mirror. This is because the metal reflector imposes a boundary condition on the light waves. The boundary condition is that for all wavelengths the amplitude of the wave is null at the metallic reflecting surface. Thus, regardless of whether the incoming light is coherent or incoherent and regardless of the wavelength, waves reflected from the metallic mirror surface have substantial nulls at the metallic reflector surface. Likewise, a phase reference is provided at the reflector surface, this reference corresponding to zero amplitude. The phase reference established by this boundary condition determines the phase of the waves at different locations in the IMOD. Moreover, this phase reference establishes for the IMOD which wavelength or wavelengths will have a null at the absorber and thus reduced absorption. Similarly, this phase reference determines which wavelength or wavelengths will pass through the absorber and what color is displayed by the IMOD.

Additionally, as a result of the boundary condition that requires that all wavelengths are null at the metallic reflector surface, an absorber location that yields a white IMOD output is determined. In particular, in various IMOD configurations, the white condition generally occurs when the absorber is in contact with or very close to the metallic mirror surface such that the wavelengths are null at the absorber. The wavelengths are therefore not substantially absorbed and white light output results.

In certain implementations of the present disclosure, however, a phase reference where a plurality of wavelengths are null can be provided at a location other than at the mirror surface. Instead, a phase reference where a plurality of the wavelengths are null can be provided at a location in the IMOD away from the reflector. In various implementations, for example, the absorber can be located at a non-zero distance from the reflector where phase reference is located. Assuming that the absorber operates substantially the same in both directions, light waves having amplitude nulls at the absorber are thereby not substantially absorbed and the light waves are allowed to pass through.

A phase reference where different wavelengths are null at a specific location away from the reflector can be provided by one or more phase shifting optical elements as described herein by way of non-limiting examples. Such optical elements can be configured to impart or result in different phases for different wavelengths that are incident on the IMOD. Example implementations of such optical elements include layers of material having different indices of refraction for different wavelengths. Propagation of light through these layers causes different wavelengths to undergo phase shifts, the phase shifts being different for different wavelengths. Other example implementations of such optical elements include holograms that impart different phase shifts for different wavelengths. Optical gratings such as reflective diffraction gratings that diffract different wavelengths at different angles and thus result in different optical path distances for different wavelengths also result in different phase shifts for different wavelengths. See, for example, FIGS. 15-19. Other types of optical elements can also be used.

In certain implementations, such optical elements can be configured to phase shift different wavelengths so that the resulting phases of the reflected waves at the absorber correspond to amplitude nulls. For example, the optical elements can be configured to phase shift various colors (such as R, G and B) such that these colors have amplitude nulls at the absorber when the absorber is spaced from the surface of the reflector by an air gap. A white display output is thereby created when the absorber is separated from the reflector by a specific distance. Such a configuration can reduce or eliminate the stiction problem discussed above that is associated with IMODs in which white is generated by contacting the absorber with the reflector.

Figure 11A:
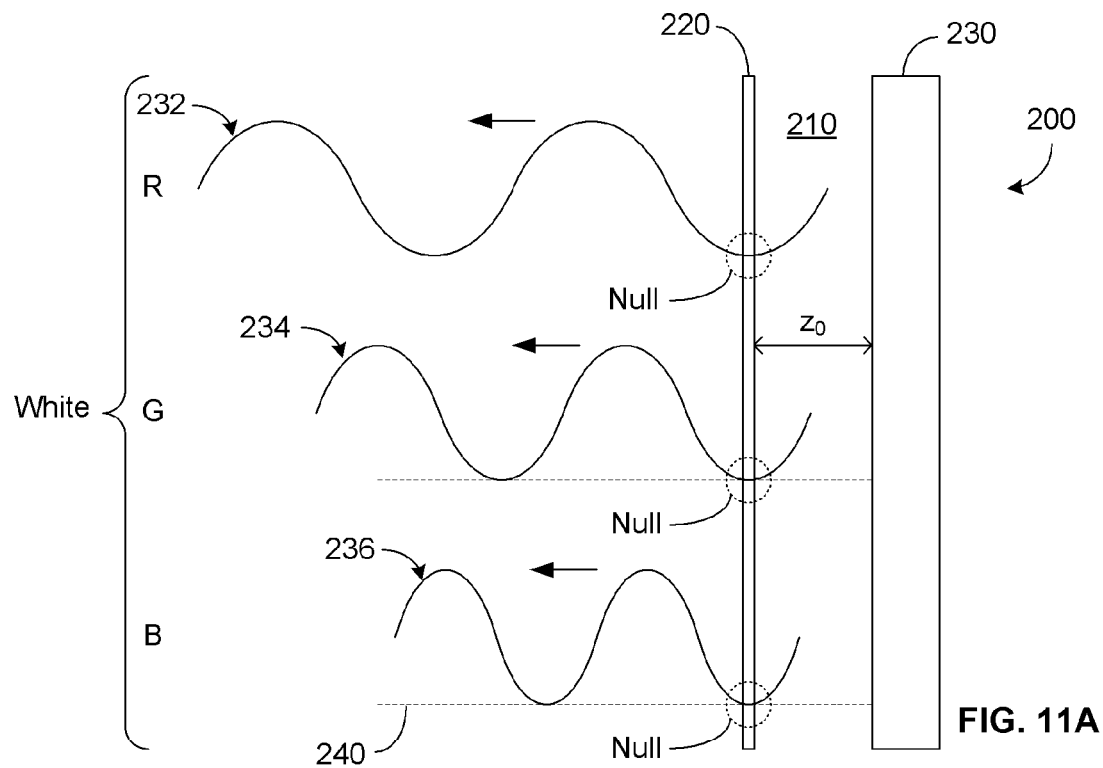
FIG. 11A shows an example implementation in which an analog IMOD is configured such that a white color output is provided when there is a non-zero spacing between an absorber and a reflector.

For example, FIG. 11A shows that in certain implementations, an IMOD 200 can include an absorber 220 and a reflector 230. The IMOD 200 can be configured so that reflected waves (e.g., R, G, and B waves 232, 234 and 236) resulting from a gap 210 dimension of $z_0$ have amplitude nulls at the absorber 220 so as to pass through the absorber 220 and yield a white display output. For example, in various implementations, the absorber 220 and/or the reflector 230 are movable and can be moved to establish the distance $z_0$ between the absorber and the reflector. The absorber is thus located at nulls for the R G B 232, 234 and 236 wavelengths and these wavelengths are allowed to pass through the absorber.

Figure 11B:
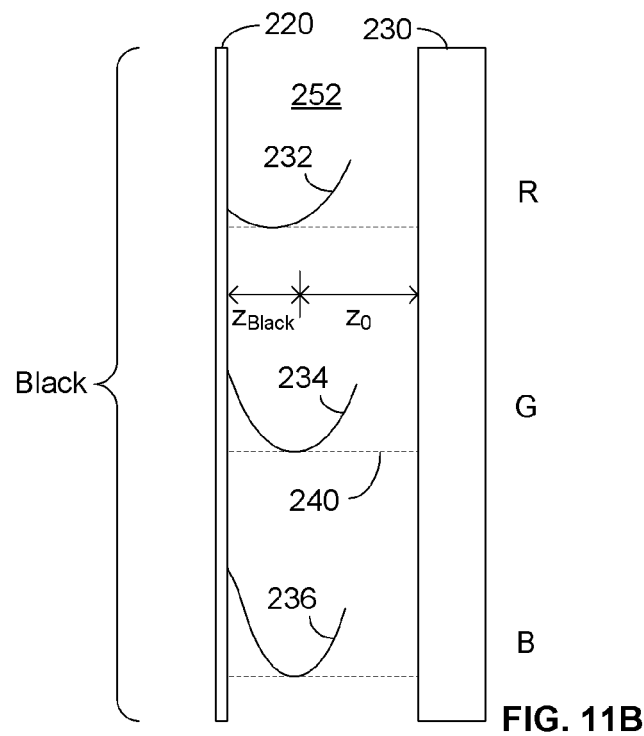
FIG. 11B shows that the example implementation of FIG. 11A can also yield black output when the spacing for the white output is increased by a selected amount.

In certain implementations, formation of black and various color outputs can be achieved by increasing the gap dimension from $z_0$ (white output) in manners similar to those described in reference to FIGS. 10B-10E. More particularly, in FIG. 11B, the absorber 220 is shown to be separated from the reflector 230 so as to define a gap 252 having a dimension of $z_0+z_{Black}$, such that amplitudes of all of the reflected R, G, and B waves, 232, 234 and 236 are significantly above the null 240. In certain implementations, the absorber 220 at such a position can absorb approximately equal amounts of energy from the R, G, and B waves 232, 234 and 236, such that the net effect of the reflection from the IMOD 200 will seem black.

Figure 11C:
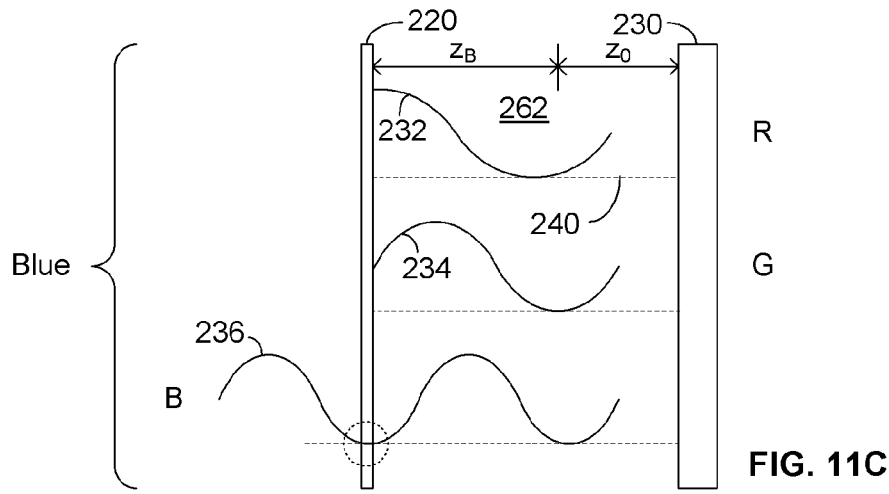
FIGS. 11C-11E show that the example implementation of FIGS. 11A and 10B can also yield selected color outputs by further increasing the spacing from the black output spacing.

In FIG. 11C, the absorber 220 is shown to be further separated from the reflector 230 so as to define a gap 262 having a dimension of $z_0+z_B$, such that amplitudes of the reflected R and G waves 232 and 234 are significantly above the null 240; but the amplitude of the reflected B wave 236 is at a substantial null. Accordingly, R and G waves 232 and 234 are absorbed by the absorber 220, and the B wave 236 is transmitted, resulting in the IMOD displaying a blue color.

Figure 11D:
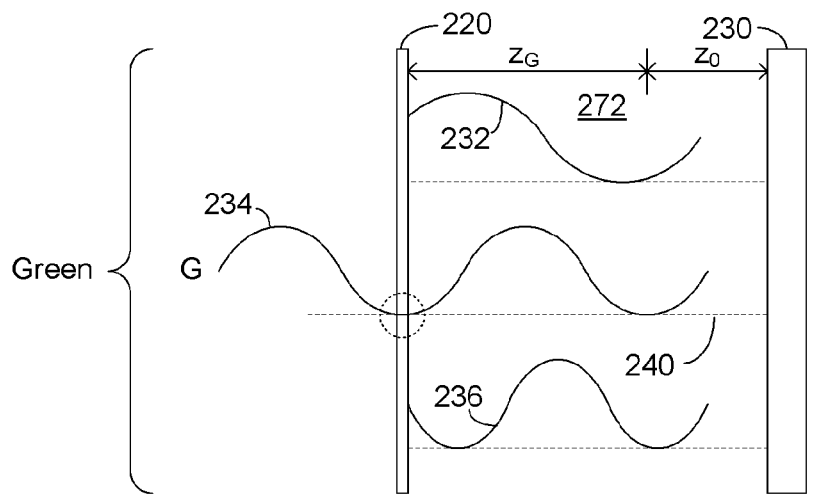

In FIG. 11D, the absorber 220 is shown to be further separated from the reflector 230 so as to define a gap 272 having a dimension of $z_0+z_G$, such that amplitudes of the reflected R and B waves 232 and 236 are significantly above the null 240; but the amplitude of the reflected G wave 234 is at a substantial null. Accordingly, R and B waves 232 and 236 are absorbed by the absorber 220, and the G wave 234 is transmitted, resulting in the IMOD displaying a green color.

Figure 11E:
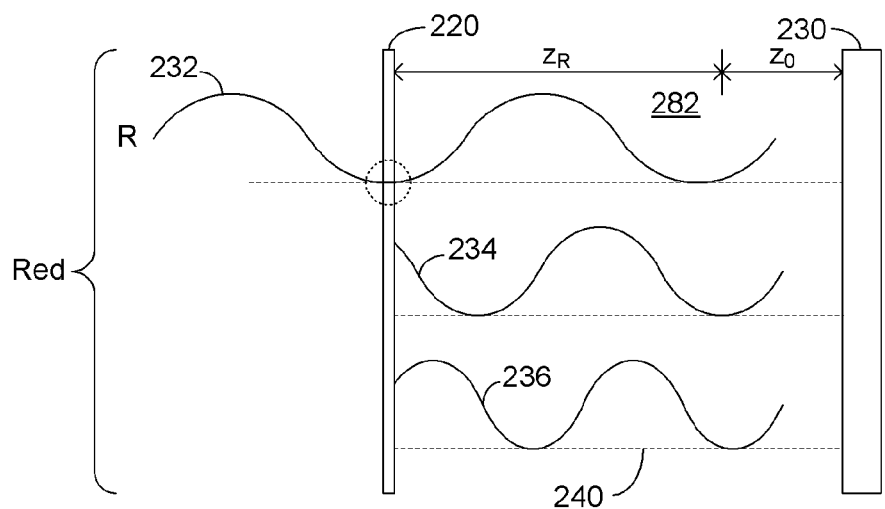

In FIG. 11E, the absorber 220 is shown to be further separated from the reflector 230 so as to define a gap 282 having a dimension of $z_0+z_R$, such that amplitudes of the reflected G and B waves 234 and 236 are significantly above the null 240; but the amplitude of the reflected R wave 232 is at a substantial null. Accordingly, G and B waves 234 and 236 are absorbed by the absorber 220, and the R wave 232 is transmitted, resulting in the IMOD displaying a red color.

Other colors can be displayed by the IMOD in similar manners.

As described herein, a phase reference away from the reflector can be provided where a plurality of wavelengths are null. The absorber of an IMOD can then be moved to the location of this phase reference. The IMOD can thereby allow formation of a white output when the absorber is separated from the reflector. To provide a phase reference away from the reflector where a plurality of wavelengths are null, the IMOD can be configured to shift the phase of different wavelengths so that the different wavelengths are null at the location of the phase reference.

Figure 12:
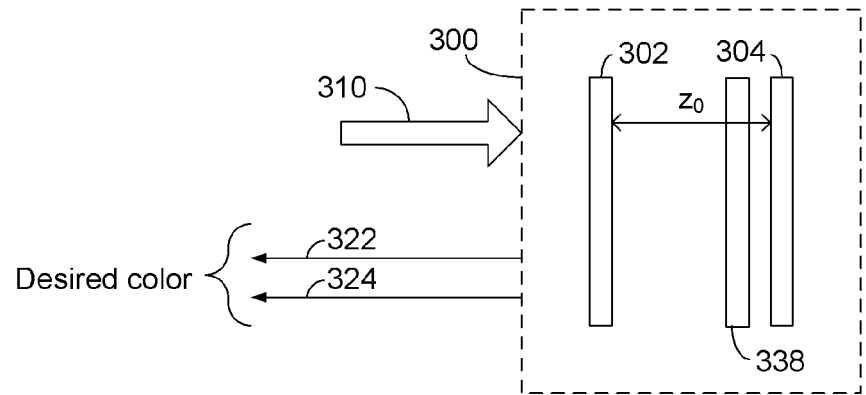
FIG. 12 shows that in certain implementations, the example IMOD of FIGS. 11A-11E can be generalized to an IMOD configured to provide a desired output having two or more color components with a non-zero absorber-reflector spacing. An optical component that introduces different phase shifts for different wavelengths may be used to establish a non-zero absorber-reflector spacing that produces this color output.

Such a feature is discussed for any desired color (as opposed to white) in connection with FIG. 12. FIG. 12 shows an IMOD 300 including an absorber 302 separated from a reflector 304 by a dimension of $z_0$.

The absorber 302 is separated from the reflector 304 by a distance $z_0$, and a gap separates the absorber 302 from the reflector 304. This gap may be an air gap. This gap may be also be filled with inert gases and may possibly be vacuum. The presence of this open region or open cavity between the absorber 302 and reflector 304 reduces the likelihood of stiction problems. In some implementations this gap is at least 50 nanometers or at least 100 nanometers although the gap may be larger or smaller.

As discussed above, the IMOD 300 can be configured such that one or both the absorber 302 and the reflector 304 can be moved to establish this distance, $z_0$. However, in discussing this example, the absorber 302 will be referred to as being movable.

The IMOD 300 can be configured to impart phase using, for example, an optical element 338 that shifts the phase of different wavelength by different amounts. This optical element 338 may include, for example, an optical element that shifts optical phase such as shown in FIGS. 15-18. The optical element 338 can introduce phase shifts for two or more different wavelengths such that the two or more different wavelengths are null at the location that is $z_0$ from the reflector 304. The absorber 302 of the IMOD can be located at that position such that these two wavelengths are not substantially absorbed by the absorber. Likewise, the corresponding reflected waves pass back through the absorber 302, without being substantially absorbed, and exit the IMOD 300. The IMOD 300 can therefore receive broadband light 310 and output at least two or more selected wavelengths of the light (arrows 322, 324). Such two or more wavelengths can be selected to yield a desired color output.

Figure 13:
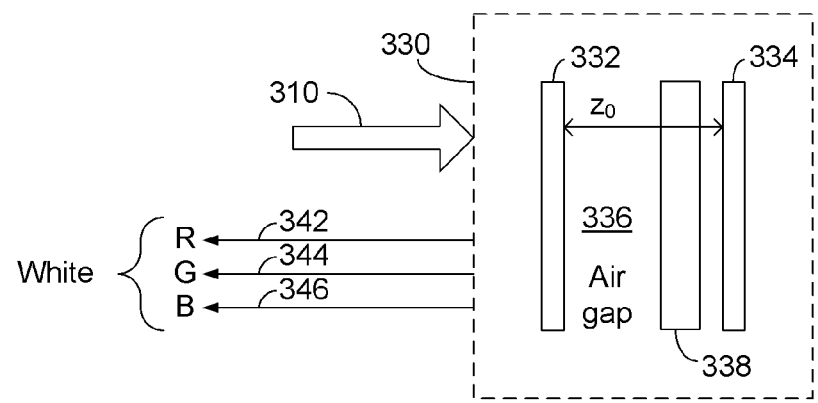
FIG. 13 shows a more specific example of the IMOD of FIG. 12, where the two or more color components can correspond to red, green and blue colors thereby producing white light. An optical component that introduces different phase shift for different wavelengths may be used to establish a non-zero absorber-reflector spacing that produces this white output.

Note that the optical element can be located elsewhere. In addition, in different implementations, more than one optical element 338 may be used and may be placed at different locations White color output from such an IMOD can be considered to be a more specific example of the configuration of FIG. 12. FIG. 13, for example, shows that an IMOD 330 can include an absorber 332 separated from a reflector 334 by a distance $z_0$. Moreover, the absorber 332 is separated from the reflector 334 by a gap thereby reducing the incidence of stiction. As describe above, this gap may be an air gap 336. This gap may be also be filled with inert gases and may possibly be vacuum. The presences of this open region or open cavity between the absorber 332 and reflector 334 reduces the likelihood of stiction problems when outputting white light. In some implementations this gap is at least 50 nanometers or at least 100 nanometers although the gap may be larger or smaller.

The IMOD 330 can be include an optical element 338 that is configured to impart phases for different wavelengths such that the different wavelengths have a null or reduced electric field strength at the location a distance of $z_0$ from the reflector 334. With reduced electric field and thus reduced absorption at the absorber 332, the reflected waves pass back through the absorber and exit the IMOD 330. Accordingly, the IMOD 330 can receive illumination light 310 and yield wavelengths components of light such as R, G, B (arrows 342, 344, 346) that produce a white color output.

As discussed above, the optical element 338 can be located elsewhere. Also, as mentioned above, in different implementations, more than one optical element 338 may be used and may be placed at different locations.

Figure 14:
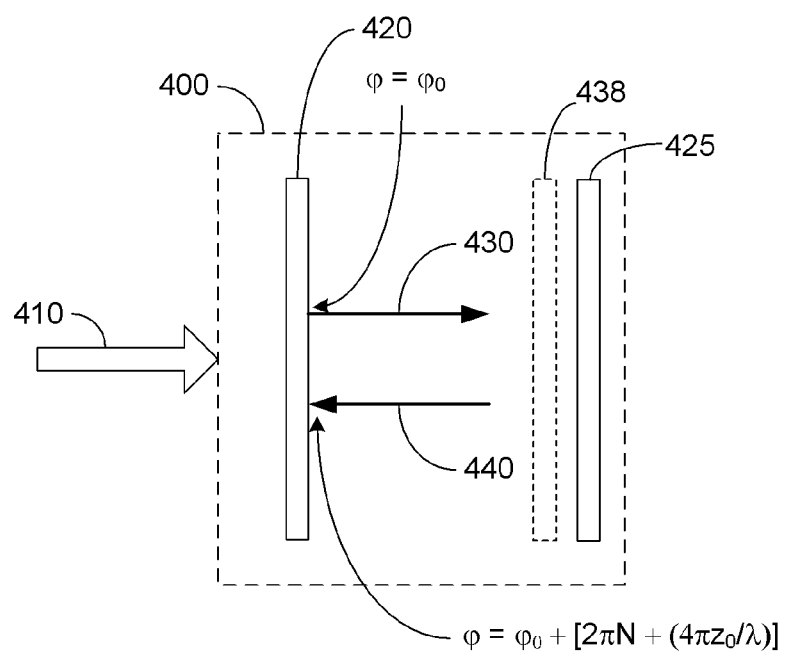
FIG. 14 shows an example representation of an implementation that can provide the output functionalities associated with FIG. 13. The drawing shows phase shift associated with propagation of light between the absorber and the reflector.

A further discussion of how for certain implementations, the IMOD 400 yields a desired color output (e.g., white color output) when the absorber 420 and reflector 425 are separated by a gap, is provided in connection with FIG. 14. For example, in various implementations, it is desired that the IMOD 400 have a reference phase $\phi=\phi_0$ at the absorber 420 that corresponds to a low electric field. As shown in FIG. 14, a portion 430 of light 410 incident on the IMOD 400 is transmitted through the absorber 420 and propagates toward the reflector 425. At least a portion 440 of this light 430 is reflected from the reflector 425 back to the absorber 420. Waves reflected from the reflector 425 in the IMOD 400 and returned to the absorber 420 are imparted with phase of $$\Delta\phi = \pi + (4\pi z_0/\lambda) \tag{Eq. 1}$$

(where $z_0$ represents a given or desired, non-zero gap between the absorber 420 and a reflector 425) for a wave having a wavelength of $\lambda$. In various implementations, the resultant phase at the absorber 420 is equal to the reference phase, $\phi=\phi_0$, such that the electric field strength is a null or substantially reduced.

In certain implementations, the IMOD 400 of FIG. 14 can be provided with, for example, a phase shifting optical element 438 (shown in phantom) that may impart phase shifts for different wavelengths such that the different wavelengths have similarly low electric field amplitudes at the location $z_0$ from the reflector 425. For example, in some implementations, the IMOD 400 is configured to impart suitable phase shifts for at least two particular wavelengths, and in some implementations, for at least three particular wavelengths such that the respective electric fields are reduced or substantially null at the location $z_0$ from the reflector 425. In certain implementations, the at least three wavelengths include wavelengths associated with red, green and blue colors and the absorber 420 is positioned at the location $z_0$ from the reflector 425.

In certain implementations, the IMOD 400 of FIG. 14 can be configured so that the imparted phase shifts introduced by Equation 1 result in a phase $\phi=\phi_0$ at the location $z_0$ from the reflector 425 for a range of wavelengths. In certain implementations, such a range can include a range of colors associated with the incident illumination light 410. In certain implementations, such a range can include red, green and blue colors.

In various implementations, IMODs having one or more features described in reference to FIGS. 12-14 can be configured in a number of ways. FIGS. 15-18 show non-limiting examples of such IMODs. FIGS. 15-18, for example, show different optical elements that introduced different phase shifts for different wavelengths such that different wavelengths each have substantially a null at the absorber.

Figure 15:
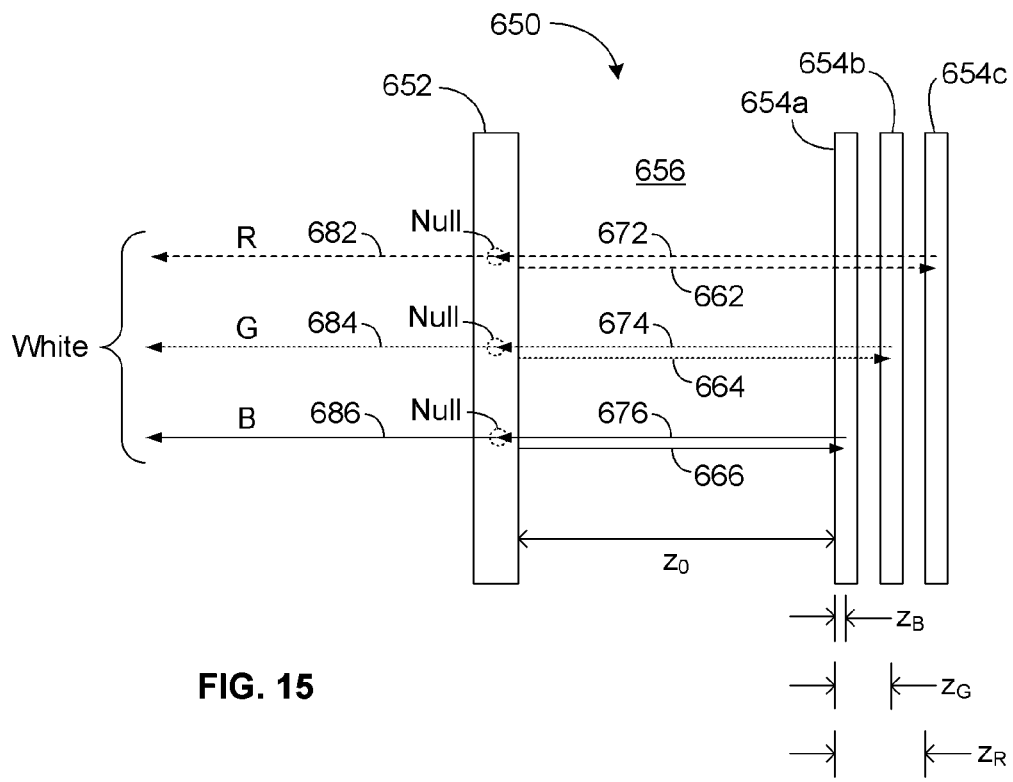
FIG. 15 shows an example implementation in which a number of wavelength selective reflecting elements can be used to provide different phases to different wavelengths of light to achieve a white output. The different phases can result from reflection of different wavelengths from different locations thereby yielding different path lengths to the absorber.

As shown in an example configuration 650 in FIG. 15, a reflector can include a number of wavelength selective reflecting elements 654a, 654b, 654c (such as thin film reflecting filters). Each film 654a, 654b, 654c can be tuned to provide relatively high reflectivity for a specific color, wavelength, or wavelength range while transmitting other wavelengths. Thus, for example, a first film 654a positioned at a distance of $z_0$ from an absorber 652 (and thus providing a gap 656) can be tuned to selectively reflect blue light, ray 666 and transmit other colors such as green and red. Similarly, second and third films 654b and 654c positioned successively further away from the absorber 652 can be tuned to selectively reflect green light, ray 664, and red light, ray 662. The green reflecting filter 654b can transmit at least red light reflected by the red reflecting filter 654c. In this example, reflective filters that reflect shorter wavelengths are placed closer to the absorber 652 and reflective filters that reflect longer wavelengths are more distant from the absorber 652. Accordingly, the optical path length is longer for the longer wavelengths than for the shorter wavelengths. Likewise the longer wavelengths may have larger phase shifts.

The resulting reflected color rays 676, 674 and 672 are shown to arrive at the absorber 652 with phases influenced by their respective travel distances. Positioning of the example three thin film reflecting filters 654 can be selected such that the reflected color rays 676, 674 and 672 all have substantial nulls at or near the absorber 652, thereby yielding a white color state (rays 682, 684 and 686) as an output.

Dichroic filters, interference filters, or other filters and filter combinations may be used.

Below is a table listing some example spacing between the absorber and the reflective surfaces of red, green, and blue reflectors. With reference to FIG. 15, $L_R=z_0+z_R$, $L_G=z_G$, and $L_B=z_0+z_B$.

TABLE 1

| N Order | $L_R$ Effective gap for red (nm) | $L_G$ Effective gap for green (nm) | $L_B$ Effective gap for blue (nm) |
| --- | --- | --- | --- |
| 0 | 315 | 260 | 220 |
| 1 | 630 | 520 | 440 |
| 2 | 945 | 780 | 660 |

Figure 16:
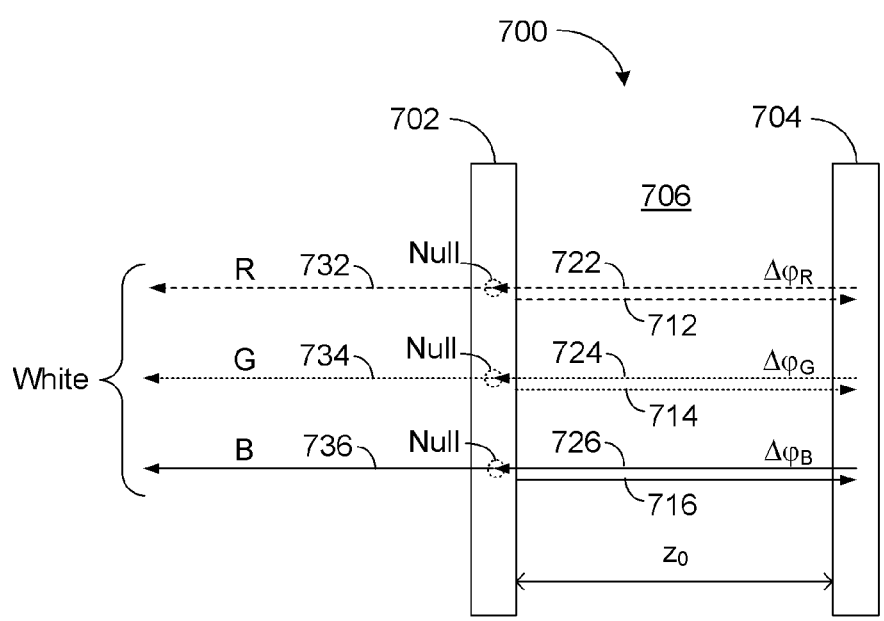
FIG. 16 shows an example of how hologram can be used to provide different phases to different color waves to achieve a white output with a non-zero gap.

FIG. 16 shows an example configuration 700 where a reflector 704 includes a reflective hologram spaced from an absorber 702 so as to define a gap 706 with a dimension of $z_0$. Such a hologram can be configured to impart different phases to different colors. For example, red, green, and blue rays 712, 714 and 716 incident on the hologram 704 are shown to be reflected into rays 722, 724 and 726 having different phases ($\Delta\phi_R$, $\Delta\phi_G$, $\Delta\phi_B$) imparted by the hologram 704. In some implementations, more phase shift is provided for longer wavelengths.

The resulting reflected color rays 722, 724, 726 with their respective phases are shown to arrive at the absorber 702 so as to have substantial nulls at or near the absorber 702, thereby yielding a white color state (rays 732, 734, 736) as an output. In certain implementations such as that shown in FIG. 16, the hologram 704 can itself provide the reflective functionality such that a separate reflector is not needed. More than one hologram may also be used. The holograms may be surface or volume holograms. Some non-limiting examples of optical elements can also include surface or volume diffractive optical elements and Bragg layers having diffractive features arranged to provide diffraction and angular dispersion.

Figure 17:
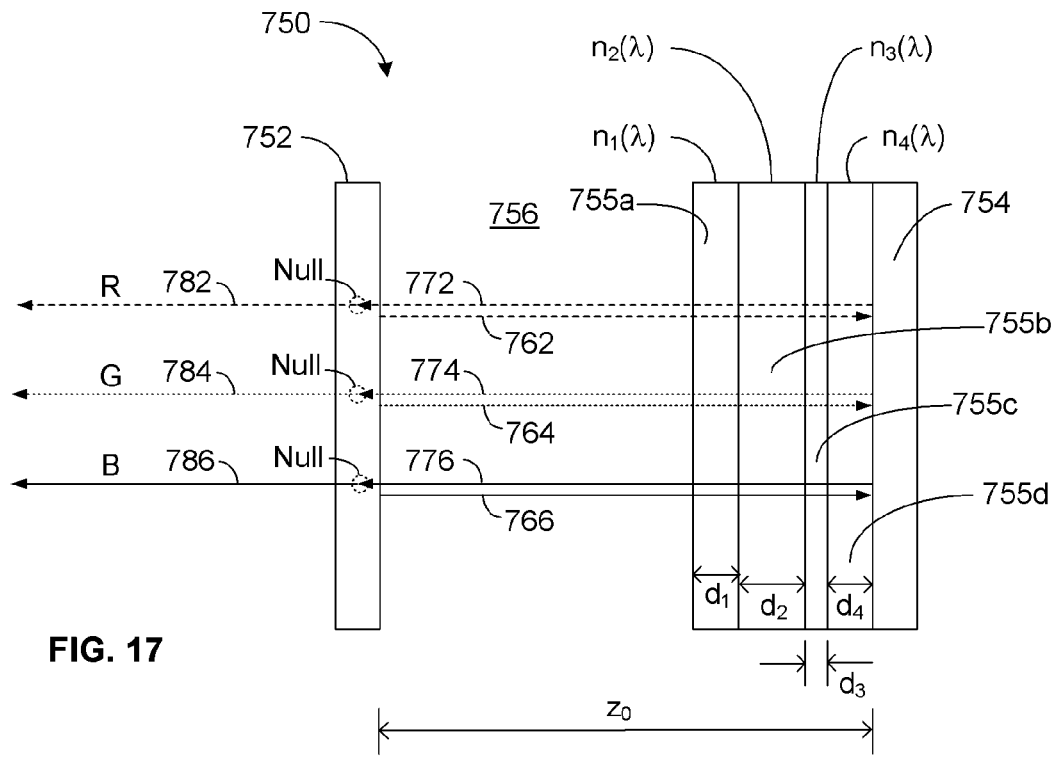
FIG. 17 shows an example of how an optical stack of N layers can be used to provide different phases to different color waves to achieve a white output with a non-zero gap. Selection of the thickness and materials for the N layers can be determined based on numerical calculation.

FIG. 17 shows an example configuration 750 where rays passing through an absorber 752 traversing a gap 756 (with a dimension of $z_0-d_1-d_2-d_3$) encounter a number of optical layers 755a, 755b, 755c and 755d prior to a reflector 754. Such a collection of optical layers 755a, 755b, 755c and 755d can be configured to provide desired reflection and phase-introducing properties. In particular, the materials used for the layers 755a, 755b, 755c and 755d may have refractive indices that are different for different wavelengths. Thus, as the light propagates through the layers 755a, 755b, 755c and 755d, different phase shifts are imparted on different wavelengths. The thicknesses of the layers 755a, 755b, 755c and 755d may be selected to provide the proper phase shifts such that different wavelength components have the appropriate phase at the absorber. The phase at the absorber 752 may, for example, provide for a null for a plurality of wavelength components at the absorber. In certain implementations, the reflector 754 can include a mirror surface.

Accordingly, in certain implementations, each optical layer 755a, 755b, 755c and 755d can have a calculated thickness d and a calculated refractive index n. For example, the reflector 754 is shown to have four layers 755a, 755b, 755c and 755d in front, and thicknesses $d_1$, $d_2$, $d_3$ and $d_4$, and refractive indices $n_1(\lambda)$, $n_2(\lambda)$, $n_3(\lambda)$ and $n_4(\lambda)$ that depend on wavelength $\lambda$. Red, green, and blue rays 762, 764, and 766 are shown passing through the four optical layers 755a, 755b, 755c and 755d and being reflected from the reflector 754. The rays 762, 764, and 766 undergo different phase changes (due to the respective refractive indices $n_1(\lambda)$, $n_2(\lambda)$, $n_3(\lambda)$ and $n_4(\lambda)$ and thicknesses $d_1$, $d_2$, $d_3$ and $d_4$) as they pass through some or all of the four example optical layers 755a, 755b, 755c and 755d. The resulting reflected color rays 772, 774 and 776 are shown to arrive at the absorber 752 so as to have substantial nulls at or near the absorber 752, thereby yielding a white color state (rays 782, 784, 786) output.

In certain implementations, the thicknesses $d_1$, $d_2$, $d_3$ and $d_4$ and refractive indices $n_1(\lambda)$, $n_2(\lambda)$, $n_3(\lambda)$ and $n_4(\lambda)$ of the optical layers 755a, 755b, 755c and 755d can be calculated in a number of ways, including numerical calculation (using, for example, thin film optimization software). In some implementations, the optical layers 755a, 755b, 755c and 755d and their thicknesses $d_1$, $d_2$, $d_3$ and $d_4$ can be selected such that the phases of the R, G, B color rays have substantial nulls at the absorber 752 when the absorber is at a distance $z_0$ from the reflector 754. A white color state when the absorber 752 is separated from the reflector 754, for example, by an air gap, is thereby provided.

Although four layers 755a, 755b, 755c and 755d are shown in FIG. 17, more or less layers may be used. Additionally, the locations of the layers 755a, 755b, 755c and 755d can be elsewhere. For example some or all the layers 755a, 755b, 755c and 755d may be closer to the absorber 752 than to the reflector 754.

Figure 18:
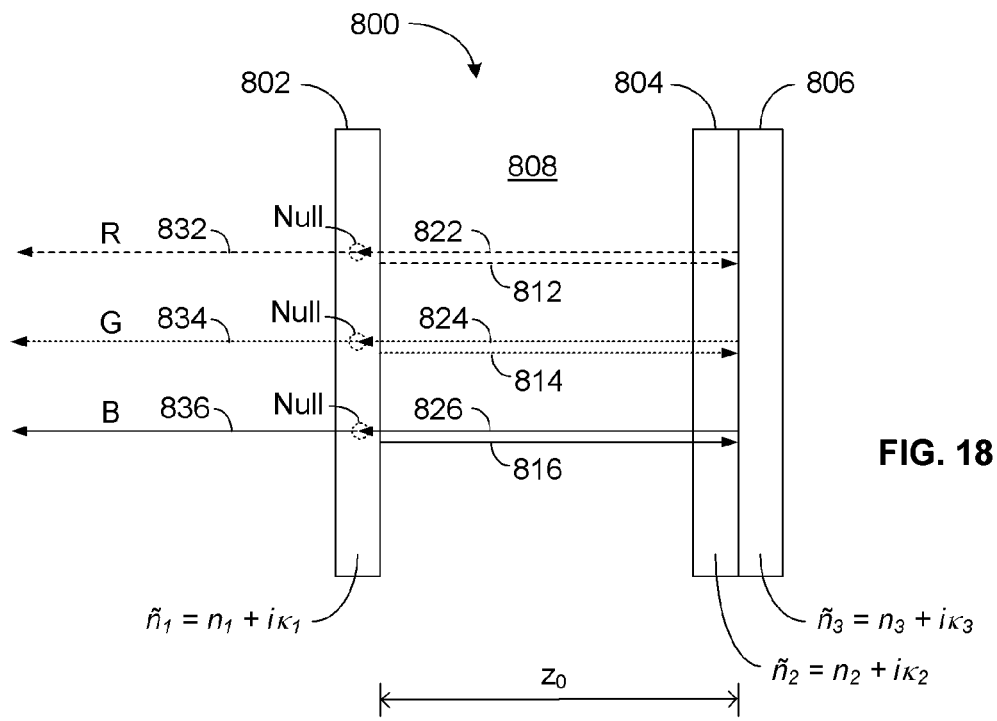
FIG. 18 shows an example of how tailoring the complex refractive index of materials used in an IMOD can provide different phases to different color waves to achieve a white output with a non-zero gap. The different phases can result from one or more of the IMOD's absorber, reflector, and a dielectric layer having appropriate complex refractive index, for example, a refractive index having a real part increases with increasing wavelength and a low imaginary part the provides for low loss.

FIG. 18 shows an example configuration 800 where one or more layers of an absorber 802, one or more layers of dielectric 804, and/or one or more layers of a reflector 806 can be formed from desired materials to provide desired optical properties. In particular, the materials used for the layers 802, 804 and 806 may have refractive indices that are different for different wavelengths. Thus, as the light propagates through the layers 802, 804 and 806, different phase shifts are imparted on different wavelengths. The thicknesses of the layers may be selected to provide the proper phase shifts such that different wavelength components have the appropriate phase at the absorber 802. The phase at the absorber 802 may, for example, provide for a null for a plurality of wavelength components at the absorber.

In this example, red, green, and blue rays 812, 814, and 816 are shown to have passed through the absorber 802 and pass through the dielectric 804 in front of the reflector 806 before being reflected. In the example shown, the absorber 802 and the dielectric 804 define a gap 808. In certain implementations, the dielectric 804 can be positioned more towards the absorber 802, for example, such that a gap is defined between the dielectric and the reflector 806.

The resulting reflected rays 822, 824, 826 are shown to arrive at the absorber layer 802 so as to have substantial nulls at or near the absorber 802 when the absorber is displaced from the reflector 806 by $z_0$, thereby yielding a white color state (rays 832, 834 and 836) as an output.

In certain implementations, the foregoing design described in reference to FIG. 18 can be similar to that described in reference to FIG. 17, in that numerical calculation can be utilized. For example the dimensions and material compositions of the various optical layers 802, 804 and 806 involved can be adjusted to provide the substantial nulls at a position where the absorber is located when the IMOD is in at least one state. In certain implementations, however, the configuration shown in FIG. 18 can be different from that of FIG. 17 in that substantially full complex refractive indices can be considered.

For a given optical material, its complex refractive index can be represented by $\tilde{n}=n+i\kappa$, where the real portion n is the refractive index representative of phase speed, and the imaginary portion $\kappa$ is the extinction coefficient representative of absorption loss in the material. Thus, complex refractive indices ($\tilde{n}_1$, $\tilde{n}_2$, $\tilde{n}_3$ in the example of FIG. 18) can be allowed to be varied to arrive at desired material configurations. In certain implementations, for example, at least one of the absorber 802 and dielectric layers 804 can possess refractive indices $n_1$, $n_2$ that increase as a function of wavelength. Such an increase in refractive indices is different from many optical materials where the relationship is reversed (where refractive index n decreases as a function of wavelength).

Although the absorber 802, dielectric 804, and reflector 806 are discussed with in connection with FIG. 18 as being tuned to provide the proper phase shift for different wavelength components, the dimensions and complex refractive index of more or less layers may be considered and set to achieve the desired phase. Additional layers may be added and the locations of the layer or layers may vary for different implementations.

Figure 19:
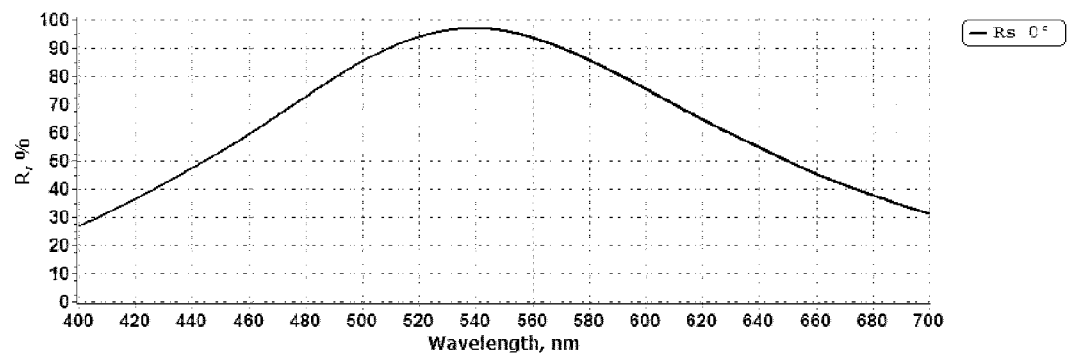
FIG. 19 is a white point reflectance spectrum on axes of reflectivity (in percent) and wavelength (in nanometers) for an example thin film design having multiple layers with suitable complex indices of refraction to provide a 20 nm air gap separation associated with the white point reflectance spectrum.

In one example thin film design multiple layers having suitable complex indices of refraction provide a 20 nm air gap separation associated with a white point reflectance spectrum that is shown in FIG. 19. The layers included in this thin film design are listed in Table 2 together with the values for complex indices of refraction, which are from a SOPRA database around mid-band in the visible spectrum. The dispersion for these materials is not given here.

TABLE 2

| Layer Material | Layer Type | Real index (at 550 nm) | Imaginary index (at 550 nm) | Thickness [nm] |
| --- | --- | --- | --- | --- |
| Ag | Mirror surface | 3.348 | 0.124 | 150 |
| SiO$_2$ | Low index | 1.459 | 0 | 68 |
| SiON | Low index | 1.636 | 0.0022 | 3.5 |
| TiO$_2$ | High index | 2.954 | 0 | 19.5 |
| Air Gap | | 1 | 0 | 20 |
| Al$_2$O$_3$ | Passivation | 1.663 | 0 | 9 |
| MoCr | Absorber | 3.890 | 3.622 | 5 |

In the various examples described in reference to FIGS. 15-18, introductions of wavelength-dependent phase differences are described as being implemented via elements or assemblies that are positioned relative to a cavity. For each of such configurations, it will be understood that such wavelength-dependent phases can also be introduced at one or more other locations of the cavity or outside the cavity, via either or both of transmissive and/or reflective modes of operation. In some instances, portions of the optical element 338 that introduce wavelength-dependent phase shift can be distributed in two or more locations. It will also be understood that such elements or assemblies that provide such wavelength-dependent phases can be implemented as surface or volume elements or assemblies.

Figure 20:
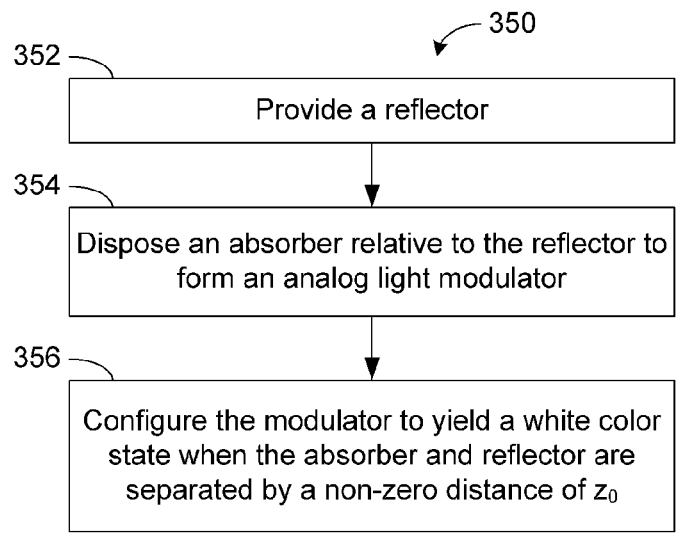
FIG. 20 shows a process that can be implemented to form an IMOD such as that of FIG. 13.

FIG. 20 shows an example process 350 that can be implemented to fabricate an IMOD similar to those described in reference to FIGS. 12-18. As shown in block 352, a reflector 304 and 334 can be provided. As shown in block 354, an absorber 302 and 332 can be disposed relative to the reflector 304 and 334 to form an IMOD. As shown in block 356, the modulator can be configured to yield a desired color output (for example, white color output) state when the absorber 302 and 332 and the reflector 304 and 334 are separated by a non-zero distance of $z_0$ that provides for a gap or open region therebetween to reduce the incidence of stiction. In particular, one or more optical elements 338 such as those discussed above in connection with FIGS. 15-18 can be used.

Figure 21A:
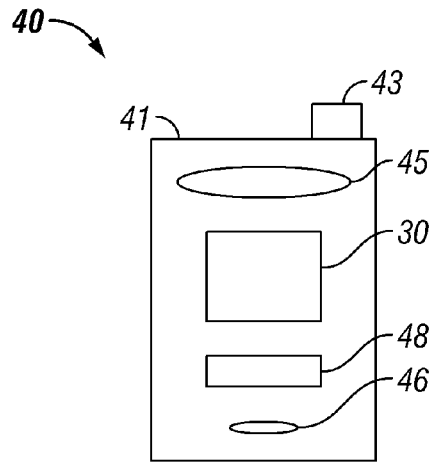
FIGS. 21A and 21B show examples of system block diagrams illustrating a display device that includes a plurality of interferometric modulators.
Figure 21B:
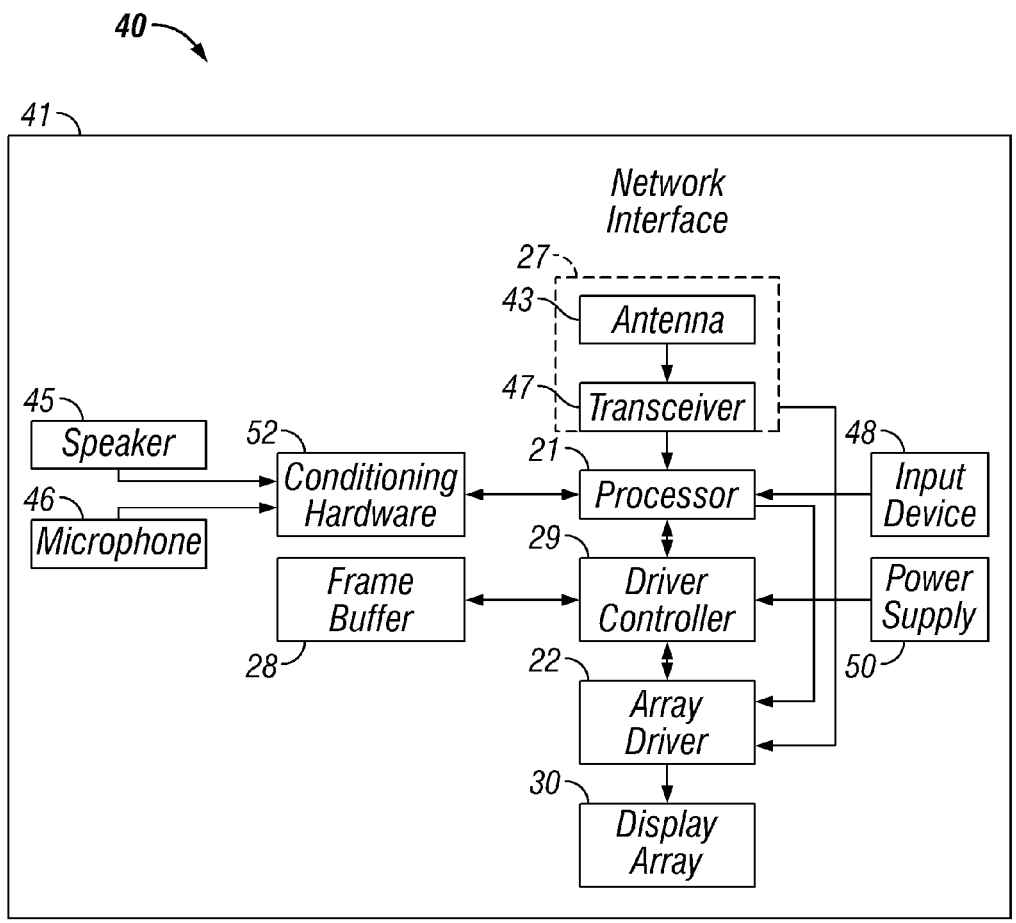

FIGS. 21A and 21B show examples of system block diagrams illustrating a display device 40 that includes a plurality of interferometric modulators, including the interferometric modulators capable of reflecting a substantially white color when an absorber and a reflector are separated by a non-zero distance of $z_0$ and when substantially white (broadband) light is incident upon the interferometric modulator. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 21B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An optical device, comprising:
    a reflector configured to reflect light;
    an absorber positioned relative to the reflector so as to provide a gap between the reflector and the absorber, at least one of the reflector and the absorber movable relative to the other; and
    an optical element disposed with respect to the reflector and the absorber such that when the absorber and the reflector are separated by a non-zero distance of $z_0$ that provides said gap between said absorber and said reflector, incident white light transmitted through the absorber and reflected from the reflector returns to the absorber and passes therethrough as a substantially white color output from the optical device.

2. The optical device of claim 1, wherein the reflector is configured to move with application of an electrical signal to the optical device.

3. The optical device of claim 1, wherein the reflector and the absorber include metal.

4. The optical device of claim 1, wherein the optical element includes a diffraction grating.

5. The optical device of claim 1, wherein the optical element includes at least one wavelength selective reflective filter.

6. The optical device of claim 1, wherein the optical element includes a hologram.

7. The optical device of claim 1, wherein the optical element includes a plurality of layers of material having indices of refraction that vary with wavelength.

8. The optical device of claim 1, wherein the optical element includes at least one layer of material comprising a complex refractive index.

9. The optical device of claim 1, wherein the optical element is disposed between the absorber and the reflector.

10. The optical device of claim 1, wherein the gap includes an air gap.

11. The optical device of claim 10, wherein the air gap is at least about 50 nm such that the absorber and the reflector are separated by at least about 50 nm.

12. The optical device of claim 10, wherein the air gap is at least about 100 nm such that the absorber and the reflector are separated by at least about 100 nm.

13. The optical device of claim 1, wherein a substantially black color output for the optical device is obtained when the absorber and the reflector are separated by a distance of $z_{Black}+z_0$.

14. The optical device of claim 13, wherein different color outputs for the optical device are obtained when the absorber and the reflector are separated by a distance greater than $z_{Black}+z_0$.

15. The optical device of claim 1, wherein the optical device includes an interferometric modulator.

16. A display having an array of the interferometric modulators of claim 15.

17. The display of claim 16, further comprising:
    a processor that is configured to communicate with the array, the processor being configured to process image data; and
    a memory device that is configured to communicate with the processor.

18. An interferometric modulator, comprising:
    an absorber configured to receive light and pass at least a portion of the light; and
    one or more optical elements including a reflective surface configured to receive light from the absorber and reflect the light back to the absorber, wherein the one or more optical elements are configured to provide different phase shifts for different wavelength components of the light reflected back to the absorber such that a plurality of wavelength components substantially pass through the absorber to yield a substantially white color output from the interferometric modulator when the absorber is spaced apart from said reflective surface by a gap.

19. The interferometric modulator of claim 18, wherein the wavelength components passed through the absorber and included in the white output correspond to red, green and blue color light.

20. The interferometric modulator of claim 18, wherein the one or more optical elements include at least one thin film reflecting filter configured to selectively reflect at least one of the wavelength components such that different wavelength components propagate different distances from the reflective surface to the absorber thereby introducing different phase shifts therebetween.

21. The interferometric modulator of claim 18, wherein the one or more optical elements include at least one hologram having a plurality of phase-shifting features configured to phase shift different wavelength components different amounts.

22. The interferometric modulator of claim 21, wherein the hologram includes said reflective surface so as to reflect the wavelength components back to the absorber.

23. The interferometric modulator of claim 21, wherein the hologram is a transmissive hologram and said reflective surface is not part of the hologram.

24. The interferometric modulator of claim 18, wherein the one or more optical elements include a plurality of optical layers, each layer having a thickness and a refractive index, such that the different wavelength components passing through the plurality of optical layers and returning to the absorber are provided with the different phase shifts.

25. The interferometric modulator of claim 18, wherein the one or more optical elements include at least one of a dielectric layer and a reflector layer having a complex refractive index so as to provide different phase shifts to different wavelength components reflected back to the absorber.

26. The interferometric modulator of claim 18, wherein the one or more optical elements include a dielectric layer and a reflector layer, each of the absorber, dielectric layer and reflector layer having a complex refractive index such that the absorber, dielectric layer and the reflector layer provide different phase shifts to different wavelength components.

27. The interferometric modulator of claim 26, wherein at least one of the absorber and the dielectric layer has a real portion of the complex refractive index that increases as a function of wavelength.

28. The interferometric modulator of claim 18, wherein the one or more optical elements include a diffraction grating configured to provide different path lengths for different wavelength components, the difference in path lengths providing different phase shifts for the different wavelength components.

29. The interferometric modulator of claim 18, wherein the gap is at least about 50 nm such that the absorber and the reflective surface are separated at least about 50 nm.

30. The interferometric modulator of claim 18, wherein the gap is at least about 100 nm such that the absorber and the reflective surface are separated at least about 100 nm.

31. An optical device, comprising:
a reflector configured to reflect light;
an absorber positioned relative to the reflector so as to provide a gap between the reflector and the absorber, at least one of the reflector and the absorber movable relative to the other; and
wherein at least one of the reflector and the absorber includes an optical element such that when the gap defines a non-zero distance of $z_0$ between the reflector and the absorber, incident white light transmitted through the absorber and reflected from the reflector returns to the absorber and passes therethrough as a substantially white color output from the optical device.

32. The optical device of claim 31, wherein the optical element includes at least one diffraction grating, hologram, wavelength selective reflective color filter, layer of dispersive material, or layer of material having a complex index of refraction or combinations thereof.

33. An optical device, comprising:
means for reflecting light;
means for absorbing light positioned relative to the reflecting means so as to provide a gap between the reflecting means and the absorbing means, at least one of the reflecting means and the absorbing means being movable relative to the other; and
an optical element disposed with respect to the reflecting means and the absorbing means such that when the absorbing means and the reflecting means are separated by a non-zero distance of $z_0$ that provides said gap between said absorbing means and said reflecting means, incident white light transmitted through the absorbing means and reflected from the reflecting means returns to the absorbing means and passes therethrough as a substantially white color output from the optical device.

34. The optical device of claim 33, wherein the reflecting means includes a reflector or the absorbing means includes an absorber.

35. The optical device of claim 33, wherein the optical element includes at least one diffraction grating, hologram, wavelength selective reflective color filter, layer of dispersive material, or layer of material having a complex index of refraction or combinations thereof.

36. An optical device, comprising:
means for reflecting light;
means for absorbing light positioned relative to the reflecting means so as to provide a gap between the reflecting means and the absorbing means, at least one of the reflecting means and the absorbing means movable relative to the other; and
wherein at least one of the reflecting means and the absorbing means includes an optical element such that when the gap defines a non-zero distance of $z_0$ between the reflecting means and the absorbing means, incident white light transmitted through the absorbing means and reflected from the reflecting means returns to the absorbing means and passes therethrough as a substantially white color output from the optical device.

37. The optical device of claim 36, wherein the reflecting means includes a reflector or the absorbing means includes an absorber.

38. The optical device of claim 36, wherein the optical element includes at least one diffraction grating, hologram, wavelength selective reflective color filter, layer of dispersive material, or layer of material having a complex index of refraction or combinations thereof.

* * * * *

UNITED STATES PATENT AND TRADEMARK OFFICE
CERTIFICATE OF CORRECTION

PATENT NO. : 8,643,936 B2  Page 1 of 1
APPLICATION NO. : 13/308324
DATED : February 4, 2014
INVENTOR(S) : Hong et al.

It is certified that error appears in the above-identified patent and that said Letters Patent is hereby corrected as shown below:

In the Specification

In column 25 at line 23 (approx.), Change "$L_G = z_G$," to --$L_G = z_0 + z_G$,--.

Signed and Sealed this
Ninth Day of September, 2014

Michelle K. Lee
*Deputy Director of the United States Patent and Trademark Office*